(12) United States Patent
Masuda et al.

(10) Patent No.: US 11,045,799 B2
(45) Date of Patent: Jun. 29, 2021

(54) DENITRATION CATALYST REGENERATION METHOD, DENITRATION CATALYST REGENERATION SYSTEM, AND CLEANING AGENT FOR DENITRATION CATALYST

(71) Applicant: MITSUBISHI POWER, LTD., Yokohama (JP)

(72) Inventors: Tomotsugu Masuda, Yokohama (JP); Masanao Yonemura, Tokyo (JP); Masanori Demoto, Yokohama (JP); Kazuhiro Iwamoto, Tokyo (JP); Toshinobu Yasutake, Tokyo (JP); Makoto Yokoyama, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 661 days.

(21) Appl. No.: 15/740,554

(22) PCT Filed: Jul. 7, 2016

(86) PCT No.: PCT/JP2016/070162
§ 371 (c)(1),
(2) Date: Dec. 28, 2017

(87) PCT Pub. No.: WO2017/010402
PCT Pub. Date: Jan. 19, 2017

(65) Prior Publication Data
US 2018/0185834 A1   Jul. 5, 2018

(30) Foreign Application Priority Data
Jul. 10, 2015 (JP) .............................. JP2015-138939

(51) Int. Cl.
| | |
|---|---|
| *B01J 38/60* | (2006.01) |
| *B01J 23/30* | (2006.01) |
| *B01J 23/92* | (2006.01) |
| *C11D 3/04* | (2006.01) |
| *B01D 53/86* | (2006.01) |
| *B01J 21/06* | (2006.01) |
| *B01D 53/96* | (2006.01) |
| *C11D 7/08* | (2006.01) |
| *C11D 7/10* | (2006.01) |

(52) U.S. Cl.
CPC .......... *B01J 38/60* (2013.01); *B01D 53/8625* (2013.01); *B01D 53/8696* (2013.01); *B01D 53/96* (2013.01); *B01J 21/063* (2013.01); *B01J 23/30* (2013.01); *B01J 23/92* (2013.01); *C11D 3/042* (2013.01); *C11D 3/046* (2013.01); *C11D 7/08* (2013.01); *C11D 7/10* (2013.01); *B01D 2255/20707* (2013.01); *B01D 2255/20723* (2013.01); *B01D 2255/20769* (2013.01); *B01D 2255/20776* (2013.01)

(58) Field of Classification Search
CPC . B01J 38/60; B01J 21/063; B01J 23/30; B01J 23/92; B01D 53/8625; B01D 53/8696; B01D 53/96; B01D 2255/20707; B01D 2255/20723; B01D 2255/20769; B01D 55/20776; C11D 3/042; C11D 3/046; C11D 7/08; C11D 7/10
USPC ........................................................ 502/27
See application file for complete search history.

(56) References Cited

U.S. PATENT DOCUMENTS

| | | |
|---|---|---|
| 5,260,238 A | 11/1993 | Murakawa et al. |
| 6,025,292 A | 2/2000 | Obayashi et al. |
| 2006/0148639 A1 | 7/2006 | Foerster |
| 2011/0172083 A1 | 7/2011 | Schluttig et al. |

FOREIGN PATENT DOCUMENTS

| | | |
|---|---|---|
| CN | 100404110 C | 7/2008 |
| CN | 104190477 A | 12/2014 |
| CN | 104289258 A | 1/2015 |
| CN | 103055963 B | 2/2015 |
| CN | 104437673 A | 3/2015 |
| JP | 2-293051 A | 12/1990 |
| JP | 5-96177 A | 4/1993 |
| JP | 10-235209 A | 9/1998 |
| JP | 2006-505386 A | 2/2006 |
| JP | 2011-31237 A | 2/2011 |

(Continued)

OTHER PUBLICATIONS

Office Action dated Oct. 20, 2017, issued in counterpart Taiwan Patent Application No. 105121559 (9 pages).

(Continued)

*Primary Examiner* — Edward M Johnson
(74) *Attorney, Agent, or Firm* — Westerman, Hattori, Daniels & Adrian, LLP

(57) ABSTRACT

Provided are: a cleaning agent for a denitration catalyst; and a denitration catalyst regeneration method and a denitration catalyst regeneration system which make it possible to efficiently remove matter adhering to a surface of a catalyst and to greatly restore catalytic performance. The regeneration method includes: a prewashing step (S12) of washing a denitration catalyst with water; a liquid agent cleaning step (S14) of immersing the denitration catalyst washed with water in a liquid agent containing an inorganic acid and a fluorine compound; a step of recovering the denitration catalyst from the liquid agent; and a finish washing step (S16) of washing the denitration catalyst recovered from the liquid agent with a finish cleaning liquid which is water or sulfamic acid-containing water.

16 Claims, 11 Drawing Sheets

(56) References Cited

FOREIGN PATENT DOCUMENTS

| JP | 2012-24669 A | 2/2012 |
|---|---|---|
| JP | 4870217 B2 | 2/2012 |

OTHER PUBLICATIONS

International Search Report dated Sep. 6, 2016, issued in counterpart International Application No. PCT/JP2016/070162 (2 pages).
International Preliminary Report on Patentability (Form PCT/IB/373) issued in counterpart International Application No. PCT/JP2016/070162 dated Jan. 16, 2018, with Form PCT/ISA/237. (8 pages).
Office Action dated Jan. 22, 2021, issued in counterpart CN Application No. 201680040042.5, with English translation (13 pages).

FIG. 16

Crushing Strength Measurement Method

| Measurement Item | Analysis Method | Analysis Apparatus/Conditions |
|---|---|---|
| Measurement of Crushing Strength | Measurement Apparatus: Kiya Hardness Tester (043019-D, Manufactured by Kiya Corporation)<br>Maximum Load: 30Kg<br>Catalyst Shape: 13 mm × 13 mm × 13 mm (Cube)<br>Number of Samples Measured: 5 Samples<br>Direction of Load: Direction Perpendicular to Gas Flow (See Arrow in figure on Right) | 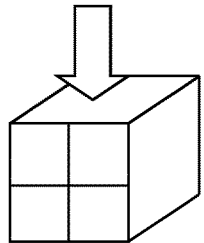<br>Measurement of Crushing Strength |

DENITRATION CATALYST REGENERATION METHOD, DENITRATION CATALYST REGENERATION SYSTEM, AND CLEANING AGENT FOR DENITRATION CATALYST

The present invention relates to a method of regenerating a denitration catalyst, a system for regenerating a denitration catalyst, and a cleaning agent for a denitration catalyst, and more particularly, relates to a regeneration method, a regeneration system, and a cleaning agent for a deactivated denitration catalyst for a coal fired boiler. The present application claims priority on Japanese Unexamined Patent Application No. 2015-138939 filed on Jul. 10, 2015, the entire content of which is incorporated herein by reference.

BACKGROUND ART

Equipment for burning fuels such as fossil fuels and biomass is provided with denitration equipment for removing nitrogen oxides which are contained in exhaust gas produced by fuel combustion. The denitration equipment includes equipment provided with a denitration catalyst which promotes removal of the nitrogen oxides. The performance of the denitration catalyst deteriorates through use. For this reason, the denitration catalyst is replaced or added in the maintenance of the denitration equipment. Regeneration for the purpose of restoring the performance is proposed to reuse the denitration catalyst.

Japanese Patent No. 4870217 describes a method of improving catalytic activity in a exhaust gas denitration apparatus used for exhaust gas of a boiler, the method including washing beforehand with water a denitration catalyst of which activity is reduced due to a silica-alumina-calcium sulfate-based poisoning substance, followed by impregnation with water, and cleaning and removing the substance at normal temperature by use of a liquid mixture of an organic acid and a fluoride. Regarding the regeneration of a denitration catalyst with reduced catalytic performance, Japanese Unexamined Patent Application Publication No. H 10-235209 describes the cleaning of the catalyst while maintaining the concentration of hydrofluoric acid in a cleaning liquid at 0.3 to 3% by mass and the temperature of the cleaning liquid at 40 to 80° C.

SUMMARY OF INVENTION

As described in the above patent documents, it is possible to greatly restore catalytic performance by use of an organic acid and a fluorine compound such as a fluoride when cleaning a denitration catalyst. However, there might be a case in which, during the regeneration processing, catalyst deactivating components such as calcium adhere to the surface of a catalyst. If a catalyst deactivating component such as calcium adheres, the catalytic performance after the regeneration processing might be insufficient. There is a problem in that the crushing strength of a denitration catalyst may be reduced due to the regeneration processing.

The present invention solves the problems described above, and an object thereof is to provide a cleaning agent for a denitration catalyst, and a denitration catalyst regeneration method and a denitration catalyst regeneration system which make it possible to efficiently remove matter adhering to the surface of a catalyst, to greatly restore the catalytic performance, and to prevent excessive reduction of crushing strength.

For the purpose of achieving the above object, a denitration catalyst regeneration method according to an aspect of the present invention at least includes: a prewashing step of washing a denitration catalyst with water; a liquid agent cleaning step of immersing the denitration catalyst washed with water in a liquid agent containing an inorganic acid and a fluorine compound; a step of recovering the denitration catalyst from the liquid agent; and a finish washing step of washing the denitration catalyst recovered from the liquid agent with a finish cleaning liquid which is water or sulfamic acid-containing water.

It is preferable that the liquid agent further contain a surfactant. In addition, it is more preferable that the surfactant be a nonionic surfactant or an anionic surfactant. This surfactant makes it possible to highly disperse calcium dissolved in the cleaning liquid and calcium in the dust, producing an effect of preventing readhesion to the catalyst.

It is also preferable that the inorganic acid include hydrochloric acid. It is desirable that the inorganic acid be hydrochloric acid containing boric acid when necessary. In addition, it is preferable that the inorganic acid contain sulfamic acid.

If the surfactant is a nonionic surfactant, it is also preferable that the nonionic surfactant be a surfactant which contains polyoxyethylene polyoxypropylene glycol, a polyoxyethylene derivative, or a polyalkylene glycol derivative as a main component. If the surfactant is an anionic surfactant, it is also preferable that the anionic surfactant be a surfactant which contains polyoxyalkylene alkyl ether phosphate ester as a main component.

It is also preferable that the liquid agent cleaning step include reducing a silica concentration on the surface of the catalyst to 6% by mass or less by immersing the denitration catalyst in the liquid agent.

It is also preferable that the prewashing step include immersing the denitration catalyst in water inside a reservoir, sealing the reservoir, and evacuating air inside the reservoir.

It is also preferable that the liquid agent cleaning step include repeatedly using the liquid agent.

For the purpose of achieving the above object, a denitration catalyst regeneration system according to another aspect of the present invention at least includes: a prewashing unit which washes a denitration catalyst with water, a liquid agent cleaning unit which immerses the denitration catalyst washed with water in a liquid agent containing an inorganic acid and a fluorine compound; a finish washing unit which finish-washes the denitration catalyst recovered from the liquid agent with a finish cleaning liquid which is water or sulfamic acid-containing water.

A denitration catalyst regeneration method and a denitration catalyst regeneration system according to at least an aspect make it possible to efficiently remove matter adhering to a surface of a catalyst, to greatly restore catalytic performance, and to prevent excessive reduction of crushing strength.

For the purpose of achieving the above object, a cleaning liquid according to still another aspect of the present invention is a cleaning liquid which cleans a deactivated denitration catalyst for a coal fired boiler and which at least includes an aqueous solution containing an inorganic acid and a fluorine compound.

It is preferable that the cleaning liquid further contain a surfactant, and the surfactant be a nonionic surfactant or an anionic surfactant.

It is also preferable that the inorganic acid include hydrochloric acid. It is desirable that the inorganic acid be, when necessary, hydrochloric acid containing boric acid as a corrosion inhibitor. It is also preferable that other than hydrochloric acid, the inorganic acid include sulfamic acid.

If the surfactant is a nonionic surfactant, it is also preferable that the nonionic surfactant be a surfactant which contains polyoxyethylene polyoxypropylene glycol, a polyoxyethylene derivative, or a polyalkylene glycol derivative as a main component. If the surfactant is an anionic surfactant, it is also preferable that the anionic surfactant be a surfactant which contains polyoxyalkylene alkyl ether phosphate ester as a main component.

BRIEF DESCRIPTION OF DRAWINGS

FIG. 16 is a Table showing the crushing strength measurement method.

DESCRIPTION OF EMBODIMENT

Figure 1:
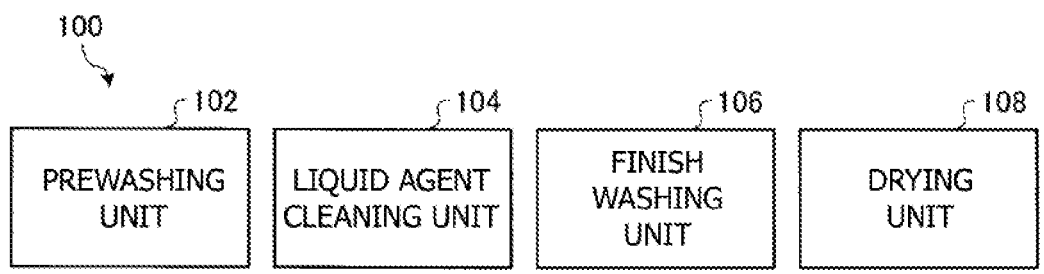
FIG. 1 is a schematic diagram showing a schematic configuration of a denitration catalyst regeneration system of a first embodiment.

Hereinafter, a preferred embodiment is described in detail with reference to the attached drawings. This embodiment does not limit the present invention. In the case of more than one embodiment, the description includes a combination of those embodiments and a partially substituted configuration.

1. First Embodiment 1-1. Cleaning Agent

A cleaning agent of a first embodiment is described. The cleaning agent of the embodiment is a cleaning agent in the form of an aqueous solution which contains at least a fluorine compound and an inorganic acid.

The fluorine compound is, for example, ammonium hydrogen fluoride ($NH_4HF_2$) or an ammonium fluoride ($NH_4F$). The fluorine compound is preferably ammonium hydrogen fluoride. The amount of ammonium hydrogen fluoride can be, for example, 1 to 10% by mass with respect to the total cleaning agent, and is preferably in the range of 1 to 5% by mass.

The inorganic acid is, for example, sulfamic acid ($H_3NSO_3$), hydrochloric acid (HCl), sulfuric acid ($H_2SO_4$), or boric acid ($H_3BO_3$). The inorganic acid is preferably hydrochloric acid, or hydrochloric acid and boric acid. Boric acid can function as a corrosion inhibitor. The amount of boric acid can be, for example, 0.001 to 10% by mass with respect to the cleaning agent. In addition, it is also preferable that the inorganic acid be sulfamic acid.

The amount of inorganic acid added is preferably such that the pH value of the cleaning agent is in the range of pH 1 to 6, and more preferably in the range of pH 1 to 3, for example. It is possible to add another substance other than the inorganic acid described above as long as the amount of acid is such that the pH value of the cleaning agent is within the above-described ranges.

It is preferable that the cleaning agent further contain a surfactant. The surfactant is more preferably a nonionic or anionic surfactant.

The nonionic surfactant is preferably a non-phosphoric acid-based surfactant which contains polyoxyethylene polyoxypropylene glycol, a polyoxyethylene derivative, or a polyalkylene glycol derivative as a main component. The ethylene oxide (EO) content of polyoxyethylene polyoxypropylene glycol can be, for example, 39% by mass. The non-phosphoric acid-based surfactant with polyoxyethylene polyoxypropylene glycol as a main component is, for example, Blaunon P-101M (manufactured by AOKI OIL INDUSTRIAL Co., Ltd.), Emulgen PP-220 (manufactured by Kao Corporation), New Pole PE-61, New Pole PE-62, New Pole PE-64, New Pole PE-68, New Pole PE-71, New Pole PE-74, New Pole PE-75, New Pole PE-78, New Pole PE-108, etc. (manufactured by Sanyo Chemical Industries, Ltd.), Evan 410, Evan 420, Evan 450, Evan 485, Evan 680, Evan 710, Evan 720, Evan 740, Evan 750. Evan 785, Evan U-103, Evan U-105, Evan U-108, etc. (manufactured by DKS Co. Ltd.), Puronon (registered trademark) #056, Puronon #101P, Puronon #105, Puronon #124, Puronon #124P, Puronon #154, Puronon #188P, Puronon #201, Puronon #202, Puronon #204, Puronon #208, Puronon #235, Puronon #235P, Puronon #237P, Puronon #238, Puronon #407P, UNILUB (registered trademark) 70DP-950B, UNILUB 75DE-2620R, etc. (manufactured by NOF CORPO- RATION), Prestall EM-440, Prestall EM-640, or Prestall RM-183, etc (manufactured by Miyoshi Oil & Fat Co., Ltd.). Meanwhile, the non-phosphoric acid-based surfactant with a polyalkylene glycol derivative as a main component is, for example, MasterAir 404 (manufactured by BASF), foam killer M-14 (manufactured by AOKI OIL INDUSTRIAL Co., Ltd.), DISPANOL WI-115 (manufactured by NOF CORPORATION), UNILUB 50 MB-2, UNILUB 50 MB-5, UNILUB 50 MB-1, UNILUB 50 MB-26, UNILUB 50 MB-72, UNILUB 60 MB-2B, UNILUB 60 MB-16, UNILUB 60 MB-26, UNILUB 75DE-15, UNILUB 75DE-25, UNILUB 75DE-60, UNILUB 75DE-170. UNILUB 75DE-2620, UNILUB 75DE-3800, UNILUB 80DE-40U, UNISAFE AX-22, UNILUB MB-7, UNILUB MB-19, UNILUB MB-700, UNILUB MB-7X, UNILUB MB-11X, UNILUB 10MS-250 KB, etc. (manufactured by NOF CORPORATION), trimming DF-300, trimming 610, etc. (manufactured by Miyoshi Oil & Fat Co., Ltd.), or Rike RK-95 (manufactured by RIKEI CHEMICAL INDUSTRY Co., Ltd.).

The anionic surfactant is preferably a phosphate ester-based surfactant which contains as a main component a phosphate ester such as polyoxyalkylene alkyl ether phosphate ester or a salt thereof. The phosphate ester-based surfactant is preferably a surfactant which contains as a main component a phosphate ester such as polyoxyethylene alkyl ether phosphate ester, or more preferably a surfactant which contains as a main component a polyoxyethylene alkyl (CS) ether phosphate ester-monoethanolamine salt. The phosphate ester-based surfactant which contains as a main component a phosphate ester or a salt thereof is, for example, Antox EHD-PNA, Newcol 100-FCP, Antox EHD-400, etc (manufactured by Nippon Nyukazai Co., Ltd.), Plysurf A208F, Plysurf A208N, Plysurf A210D, or Plysurf M208F, etc (manufactured by DKS Co. Ltd.).

The amount of surfactant can be, for example, 0.001 to 10% (by mass with respect to the total cleaning agent.

1-2. Regeneration System

FIG. 1 shows a schematic configuration of a denitration catalyst regeneration system of the first embodiment. A denitration catalyst regeneration system 100 shown in FIG. 1 executes a process of restoring catalytic performance of a denitration catalyst. The target denitration catalyst is, for example, a used denitration catalyst with reduced catalytic performance because it is poisoned after denitration use for exhaust gas which contains poisoning substances such as silica, calcium, phosphorus, arsenic, sodium, and potassium produced from a coal fired boiler. The target denitration catalyst includes a lattice (honeycomb) catalyst, a plate-shaped catalyst, and a corrugated catalyst. The denitration catalyst contains titanium dioxide ($TiO_2$) as a support, and at least one of vanadium (V), tungsten (W), and molybdenum (Mo) as an active component, for example.

As shown in FIG. 1, the denitration catalyst regeneration system 100 includes a prewashing unit 102, a liquid agent cleaning unit 104, a finish washing unit 106, and a drying unit 108. The prewashing unit 102 is configured to wash the denitration catalyst with water and to remove foreign matter, ash, soluble calcium, etc. adhering to the denitration catalyst. It is possible to use as the prewashing unit 102 an apparatus which includes a reservoir and a mechanism of supplying water to the reservoir, and which introduces a denitration catalyst into the reservoir storing water to immerse the denitration catalyst in water. It is also possible to use as the prewashing unit 102 an apparatus which includes e.g. a showerhead to splash water onto a denitration catalyst, thereby immersing the denitration catalyst in water. The prewashing unit 102 may remove foreign matter by washing a denitration catalyst with 6 water, or alternatively may use a liquid mixed with a component for cleaning the denitration catalyst.

The liquid agent cleaning unit 104 is configured to remove foreign matter adhering to the denitration catalyst by immersing the denitration catalyst in a liquid agent (cleaning agent). The liquid agent of the embodiment contains at least an inorganic acid and a fluorine compound. To be more specific, the liquid agent is a liquid mixture of an inorganic acid and a fluorine compound and can preferably be utilized as the cleaning agent of the embodiment.

As in the case of the prewashing unit 102, it is possible to use as the liquid agent cleaning unit 104 an apparatus which includes a reservoir and a mechanism of supplying liquid agent to the reservoir, and which introduces a denitration catalyst into the reservoir storing liquid agent to immerse the denitration catalyst in the liquid agent. It is also possible to use as the liquid agent cleaning unit 104 an apparatus which includes e.g. a showerhead to splash liquid agent onto a denitration catalyst, thereby immersing the denitration catalyst in liquid agent.

The finish washing unit 106 is configured to remove or reduce the liquid agent adhering to the denitration catalyst by performing, using a finish cleaning liquid, finish washing of the denitration catalyst impregnated with the liquid agent in the liquid agent cleaning unit 104. It is possible to use as the finish washing unit 106 an apparatus which includes a reservoir and a mechanism of supplying finish cleaning liquid to the reservoir, and which introduces a denitration catalyst into the reservoir storing finish cleaning liquid to immerse the denitration catalyst in the finish cleaning liquid, and then removes or reduces the liquid agent adhering to the denitration catalyst. It is also possible to use as the finish 6 washing unit 106 an apparatus which includes e.g. a showerhead to splash finish cleaning liquid onto a denitration catalyst, thereby removing or reducing the liquid agent adhering to the denitration catalyst.

The finish cleaning liquid is, for example, water ($H_2O$), sulfamic acid ($H_3NSO_3$), or a liquid mixture thereof. The finish cleaning liquid preferably contains sulfamic acid. To be more specific, the finish cleaning liquid is preferably a liquid mixture of water and sulfamic acid of a predetermined concentration (hereinafter referred to as sulfamic acid-containing water). The amount of sulfamic acid is, for example, 0.5 mol/l to 5 mol/l with respect to water.

The drying unit 108 is configured to remove water from the denitration catalyst subjected to finish washing in the finish washing unit 106. The drying unit 108 is configured to remove water adhering to the denitration catalyst by allowing gas heated to 100° C. or more, for example gas of 130° C. through the denitration catalyst. It is sufficient for the drying unit 108 to remove water. The drying unit 108 may blow off water by sending dry air to the denitration catalyst. In the drying unit 108, the denitration catalyst may be dried in a space heated to 100° C. or more.

1-3. Regeneration Method

Figure 2:
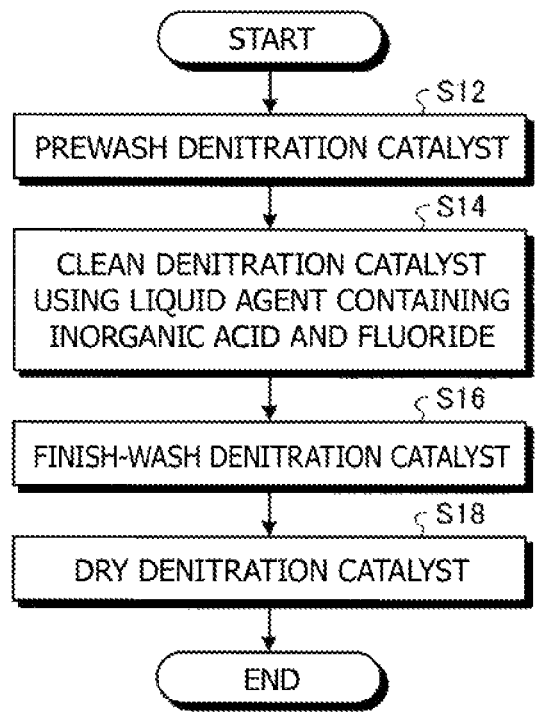
FIG. 2 is a flowchart showing an example of a denitration catalyst regeneration method of the first embodiment.

FIG. 2 shows in the form of a flowchart an example of a denitration catalyst regeneration method of the first embodiment. The denitration catalyst regeneration method shown in FIG. 2 can be carried out if the units of the denitration catalyst regeneration system 100 execute the processes. The denitration catalyst regeneration method of the embodiment includes a prewashing step, a liquid agent cleaning step, a step of recovering a denitration 6 catalyst, and a finish washing step.

As shown in FIG. 2, the denitration catalyst regeneration system 100 causes the prewashing unit 102 to wash the denitration catalyst with water as the prewashing step (step S12). Inside the prewashing unit 102, the denitration catalyst regeneration system 100 washes the denitration catalyst with water to remove foreign matter adhering to the surface, making it easy for liquid to enter the denitration catalyst.

After prewashing the denitration catalyst, the denitration catalyst regeneration system 100 immerses the denitration catalyst washed with water in the liquid agent containing an inorganic acid and a fluorine compound inside the liquid agent cleaning unit 104 as the liquid agent cleaning step (step S14). The denitration catalyst regeneration system 100 immerses the denitration catalyst in the liquid agent for 15 minutes or more and 60 minutes or less. The denitration catalyst regeneration system 100 removes substances adhering to the denitration catalyst, specifically silica ($SiO_2$) etc. by immersing the denitration catalyst in the liquid agent.

After immersing the denitration catalyst in the liquid agent, the denitration catalyst regeneration system 100 recovers the denitration catalyst from the liquid agent as the step of recovering a denitration catalyst. After that, the denitration catalyst regeneration system 100 performs, using the finish cleaning liquid, finish washing of the denitration catalyst recovered from the liquid agent inside the finish washing unit 106 as the finish washing step (step S16). The denitration catalyst regeneration system 100 removes the liquid agent adhering to the denitration catalyst by causing the finish washing unit 106 to perform finish washing.

After performing finish washing by use of the finish cleaning liquid inside the finish washing unit 106, the denitration catalyst regeneration system 100 subsequently vaporizes water adhering to the denitration catalyst inside the drying unit 108, thereby drying the denitration catalyst.

Since the embodiment uses a liquid mixture containing an inorganic acid and a fluorine compound as a liquid agent, it is possible to efficiently remove poorly soluble silica and to increase the restoration rate for the performance of the denitration catalyst to a high level while preventing elution of active components such as vanadium from the denitration catalyst. To be more specific, it is possible to regenerate the denitration catalyst to a denitration catalyst with high catalytic performance. This makes it possible to increase the catalytic performance to a high level without the process of impregnation with the active components of the catalyst after the finish washing unit performs finish washing. For example, in comparison with a regeneration method which uses alkaline sodium hydroxide (NaOH) as the liquid agent, it is possible to omit steps such as a neutralization step by use of e.g. sulfuric acid, an impregnation step of immersing eluted vanadium in an aqueous solution of vanadyl sulfate ($VOSO_4$) and then causing the vanadium to function as a support again, and drying step after the impregnation step. This makes it possible to avoid the increase in the number of steps of the regeneration processing attributed to the process of impregnation with the active components.

Also, it is possible to reduce e.g. calcium which adheres during the regeneration processing. This makes it possible to increase the restoration rate for the performance of the denitration catalyst to a high level even when the liquid agent is repeatedly used during the regeneration processing. In other words, it is possible to use the liquid agent several times.

The liquid agent particularly preferably contains hydrochloric acid as the inorganic acid. Use of hydrochloric acid as the inorganic acid makes it possible to dissolve calcium and to prevent calcium from adhering to the denitration catalyst during the regeneration processing.

Further, the liquid agent particularly preferably contains boric acid in hydrochloric acid. Addition of boric acid to the liquid agent makes it possible to prevent iron from eluting from the pack frame of the denitration catalyst and thus to prevent increase in $SO_2$ oxidation rate in the liquid agent.

The liquid agent preferably uses ammonium hydrogen fluoride as the fluorine compound. This makes it possible to increase the restoration rate for the catalytic performance of the denitration catalyst without using an aqueous solution of poisonous substance hydrogen fluoride.

According to the embodiment, the liquid agent preferably further contains a surfactant. The liquid agent is preferably a liquid mixture of an inorganic acid, a fluorine compound, and a surfactant. If the liquid agent contains a surfactant, it is possible to prevent calcium from adhering to the denitration catalyst during the regeneration processing. As a result, it is possible to increase the restoration rate for the performance of the denitration catalyst to an even higher level and to prevent excessive reduction of crushing strength of the denitration catalyst. To be more specific, it is possible to regenerate the denitration catalyst to one with even higher catalytic performance, i.e. to increase the number of uses of the liquid agent. Additionally, it is possible to lower the temperature required for a chemical cleaning 6 step and to shorten the time required for the chemical cleaning step. As a result, it is possible to cut the process costs for the regeneration processing.

The surfactant is, for example, a phosphoric acid-based surfactant or a non-phosphoric acid-based surfactant. The phosphoric acid-based surfactant is, for example, a phosphate ester such as polyoxyalkylene alkyl ether phosphate ester or a salt thereof. The non-phosphoric acid surfactant is, for example, polyoxyethylene polyoxypropylene glycol, a polyoxyethylene derivative, or a polyoxyethylene derivative.

The liquid agent containing an inorganic acid and a fluorine compound is, for example, a liquid mixture prepared by mixing hydrochloric acid and boric acid as inorganic acids and ammonium hydrogen fluoride as a fluorine compound; a liquid mixture prepared by mixing sulfamic acid as an inorganic acid and ammonium hydrogen fluoride as a fluorine compound; or a liquid mixture prepared by mixing hydrochloric acid as an inorganic acid and ammonium hydrogen fluoride as a fluorine compound.

The liquid agent containing an inorganic acid, a fluorine compound, and a surfactant is, for example, a liquid mixture prepared by mixing sulfamic acid as an inorganic acid, a phosphate ester as a surfactant, and ammonium hydrogen fluoride as a fluorine compound; a liquid mixture prepared by mixing sulfamic acid as an inorganic acid, a polyoxyethylene derivative as a surfactant, and ammonium hydrogen fluoride as a fluorine compound: a liquid mixture prepared by mixing hydrochloric acid and boric acid as inorganic acids, a phosphate ester as a surfactant, and ammonium hydrogen fluoride as a fluorine compound; or a liquid mixture prepared by mixing hydrochloric acid and boric acid as inorganic acids, a polyoxyethylene derivative as a surfactant, and ammonium hydrogen fluoride as a fluorine 6 compound.

According to the embodiment, the finish cleaning liquid preferably contains sulfamic acid. To be more specific, the finish cleaning liquid is preferably a liquid mixture of water and sulfamic acid. Use of the finish cleaning liquid containing sulfamic acid makes it possible to reduce calcium and alumina on the surface of the catalyst after the regeneration processing. For this reason, it is possible to increase the restoration rate for the catalytic performance to an even higher level. This makes it possible to maintain the restoration rate for the performance of the denitration catalyst at a high level even when the liquid agent and the finish cleaning liquid are repeatedly used. In other words, it is possible to increase the number of uses of the liquid agent.

2. Second Embodiment

2-1. Regeneration System

Figure 3:
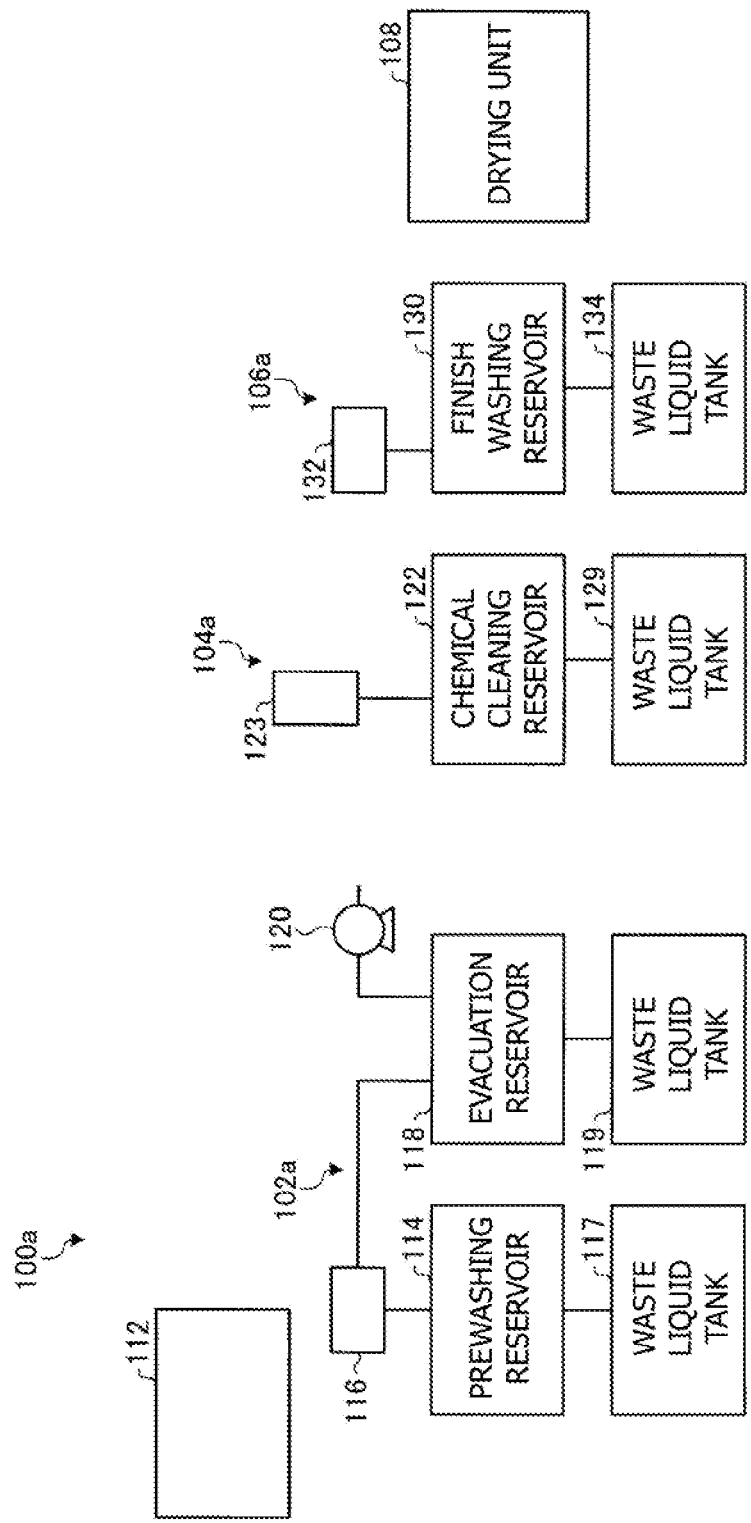
FIG. 3 is a schematic diagram showing a schematic configuration of a denitration catalyst regeneration system of a second embodiment.

FIG. 3 shows a schematic configuration of a denitration catalyst regeneration system of a second embodiment. A denitration catalyst regeneration system 100a of the second embodiment shown in FIG. 3 can be combined with the denitration catalyst regeneration system 100 or with other embodiments. This is the case with other embodiments. Each of the embodiments is an example and can be partially combined with other embodiments.

As shown in FIG. 3, the denitration catalyst regeneration system 100a includes a prewashing unit 102a, a liquid agent cleaning unit 104a, a finish washing unit 106a, a drying unit 108, and a catalyst transporting apparatus 112. The catalyst transporting apparatus 112 is an apparatus which detaches the denitration catalyst from the denitration equipment provided with the denitration catalyst and transports the detached denitration catalyst. The 6 catalyst transporting apparatus 112 can include a crane for transporting a catalyst, a vehicle, and a hand truck moved by human power, for example.

The prewashing unit 102a includes a prewashing reservoir 114, a water supplying apparatus 116, a waste liquid tank 117, an evacuation reservoir 118, a waste liquid tank 119, and a vacuum pump 120. The prewashing reservoir 114 is a container which is larger in size than the denitration catalyst for the regeneration processing and which is capable of storing liquid. The water supplying apparatus 116 includes e.g. a tank for storing water and a valve for controlling water supply and is configured to supply each of the prewashing reservoir 114 and the evacuation reservoir 118 with water to be used for prewashing and evacuation. The waste liquid tank 117 is a container which stores water discharged from the prewashing reservoir 114. The evacuation reservoir 118 is a container which is larger in size than the denitration catalyst for the regeneration processing and is capable of storing liquid. The evacuation reservoir 118 of the embodiment includes e.g. a lid and is configured such that the denitration catalyst can be put in and out of it and it is tightly sealable. The waste liquid tank 119 is a container which stores water discharged from the evacuation reservoir 118. The prewashing unit 102a may be configured such that the waste liquid tank 117 and the waste liquid tank 119 together make up a single tank. The vacuum pump 120 is configured to evacuate air inside the evacuation reservoir 118.

The liquid agent cleaning unit 104a includes a chemical cleaning reservoir 122, a liquid agent supplying apparatus 123, and a waste liquid tank 129. The chemical cleaning reservoir 122 is a container which is larger in size than the denitration catalyst for the regeneration processing and is capable of storing a liquid. The liquid agent supplying apparatus 123 includes e.g. a tank for storing a liquid agent and a valve for controlling liquid 6 agent supply and is configured to supply the chemical cleaning reservoir 122 with the liquid agent to be used for liquid agent cleaning. The waste liquid tank 129 is a container which stores the liquid agent discharged from the chemical cleaning reservoir 122.

The finish washing unit 106a includes a finish washing reservoir 130, a supplying apparatus 132, and a waste liquid tank 134. The finish washing reservoir 130 is a container which is larger in size than the denitration catalyst for the regeneration processing and is capable of storing liquid. The supplying apparatus 132 includes e.g. a tank for storing the finish cleaning liquid described in the present specification and a valve for controlling finish cleaning liquid supply and is configured to supply the finish washing reservoir 130 with the finish cleaning liquid. The waste liquid tank 134 is a container which stores the finish cleaning liquid discharged from the finish washing reservoir 130.

The drying unit 108 has the same configuration as that of the drying unit 108 in the denitration catalyst regeneration system 100.

2-2. Regeneration Method

Figure 4:
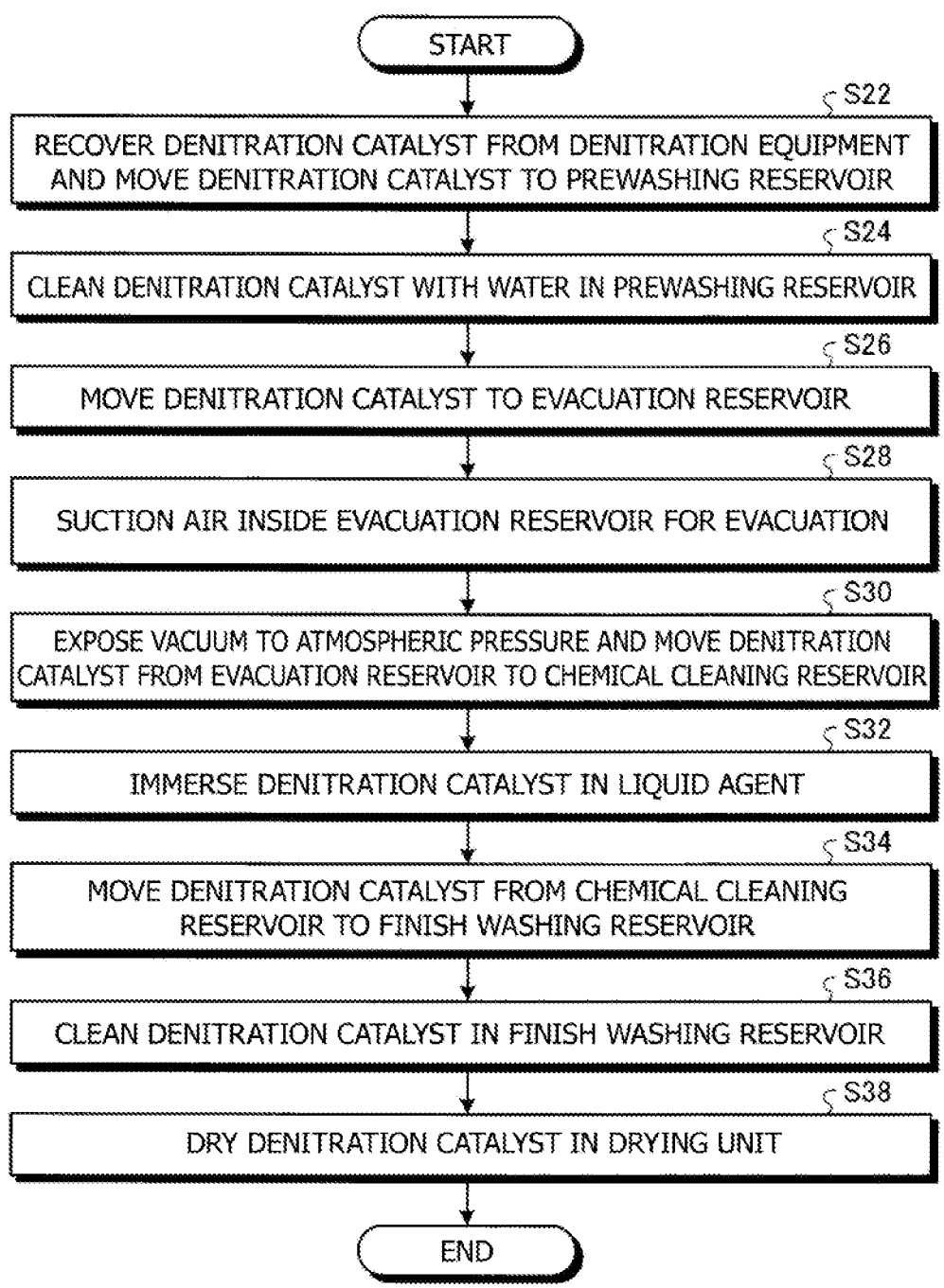
FIG. 4 is a flowchart showing an example of a denitration catalyst regeneration method of the second embodiment.

FIG. 4 shows in the form of a flowchart an example of a denitration catalyst regeneration method of the second embodiment. The denitration catalyst regeneration method shown in FIG. 4 can be carried out if the units of the denitration catalyst regeneration system 100a execute the processes. The denitration catalyst regeneration method of the embodiment includes a prewashing step, a liquid agent cleaning step, a finish washing step, and a drying step.

As shown in FIG. 4, the denitration catalyst regeneration system 100a causes the 6 catalyst transporting apparatus 112 to recover the denitration catalyst from the denitration equipment and to move the recovered denitration catalyst to the prewashing reservoir 114 as the prewashing step (step S22). Inside the prewashing reservoir 114, the denitration catalyst regeneration system 100a subsequently cleans the denitration catalyst with water (step S24). The denitration catalyst regeneration system 100a may transport the denitration catalyst to the empty prewashing reservoir 114 and then cause the water supplying apparatus 116 to supply the prewashing reservoir 114 with water, or may alternatively cause the water supplying apparatus 116 to supply the prewashing reservoir 114 with water and to introduce the denitration catalyst to the prewashing reservoir 114 storing water.

After cleaning the denitration catalyst with water inside the prewashing reservoir 114, the denitration catalyst regeneration system 100a subsequently causes the catalyst transporting apparatus 112 to move the denitration catalyst to the evacuation reservoir 118 (step S26). After transporting the denitration catalyst to the evacuation reservoir 118, the denitration catalyst regeneration system 100a causes the vacuum pump 120 to evacuate the air inside the evacuation reservoir 118 for evacuation (step S28). If the inside of the denitration catalyst is clogged with foreign matter, evacuation of the evacuation reservoir 118 makes it possible for the denitration catalyst regeneration system 100a to draw in foreign matter. After evacuating the evacuation reservoir 118, the denitration catalyst regeneration system 100a exposes the evacuation reservoir 118 to atmospheric pressure and causes the catalyst transporting apparatus 112 to move the denitration catalyst from the evacuation reservoir 118 to the chemical cleaning reservoir 122 (step S30). In the processes from step S24 to step S28, the denitration catalyst regeneration system 100a performs prewashing and removes foreign matter adhering to the surface, making it easy for liquid to enter the denitration catalyst.

After moving the denitration catalyst to the chemical cleaning reservoir 122, the denitration catalyst regeneration system 100a immerses the denitration catalyst in the liquid agent inside the chemical cleaning reservoir 122 as the liquid agent cleaning step (step S32). The denitration catalyst regeneration system 100*a* may immerse the denitration catalyst provided inside the chemical cleaning reservoir 122 in the liquid agent by moving the denitration catalyst to the chemical cleaning reservoir 122 and then supplying the chemical cleaning reservoir 122 with the liquid agent, or may alternatively immerse the denitration catalyst provided inside the chemical cleaning reservoir 122 in the liquid agent by moving the denitration catalyst to the chemical cleaning reservoir 122 storing the liquid agent. In the denitration catalyst regeneration system 100*a*, the process at step S32 is liquid agent cleaning.

After immersing the denitration catalyst in the liquid agent, the denitration catalyst regeneration system 100*a* causes the catalyst transporting apparatus 112 to move the denitration catalyst from the chemical cleaning reservoir 122 to the finish washing reservoir 130 as the finish washing step (step S34). After moving the denitration catalyst to the finish washing reservoir 130, the denitration catalyst regeneration system 100*a* cleans (performs finish washing of) the denitration catalyst inside the finish washing reservoir 130 (step S36), or specifically, supplies the finish washing reservoir 130 with the finish cleaning liquid from the supplying apparatus 132 and cleans the denitration catalyst with the finish cleaning liquid. Here, the denitration catalyst regeneration system 100*a* may execute the process while discharging the finish cleaning liquid inside the finish washing reservoir 130 or may store the finish cleaning liquid in the finish washing reservoir 130.

After finish cleaning of the denitration catalyst, the denitration catalyst regeneration system 100*a* subsequently moves the denitration catalyst to the drying unit 108 and dries the denitration catalyst in the drying unit 108 (step S38).

According to the embodiment, the denitration catalyst regeneration system 100*a* reduces the air pressure inside the evacuation reservoir 118 by evacuating the air inside the evacuation reservoir 118 during prewashing, thus creating a near vacuum. This makes it possible to evacuate the air remaining inside the denitration catalyst and to reliably remove foreign matter clogging the gaps of the denitration catalyst. The denitration catalyst regeneration system 100*a* preferably reduces the air pressure inside the evacuation reservoir 118 to −600 mmHg or less by evacuating the air inside the evacuation reservoir 118 during prewashing. When the air pressure inside the reservoir is reduced to −600 mmHg or less, it is possible to remove foreign matter clogging the denitration catalyst and to immerse the whole denitration catalyst in water.

According to the embodiment, in the denitration catalyst regeneration system 100*a*, it is possible to efficiently use the liquid agent by repeatedly using the liquid agent. Also, as in the foregoing description, since the liquid agent containing an inorganic acid and a fluorine compound can prevent readhesion of calcium, it is possible to maintain the performance of removing silica even after being used several times. To be more specific, even after the NOx catalyst is immersed in the liquid agent in the chemical cleaning reservoir 122 and then the denitration catalyst is recovered from the chemical cleaning reservoir 122, the denitration catalyst regeneration system 100*a* does not discharge the liquid agent, in which the denitration catalyst was immersed, to the waste liquid tank 129, but stores the liquid agent in the chemical cleaning reservoir 122. After that, the next denitration catalyst is moved to the chemical cleaning reservoir 122 storing the liquid agent. This makes it possible for the denitration catalyst regeneration system 100*a* to repeatedly use the liquid agent. In the case 8 of repeatedly using the liquid agent, the denitration catalyst regeneration system 100*a* may adjust the components of the liquid agent at the second and subsequent time of use of the liquid agent, in other words, when the second and subsequent denitration catalyst is immersed. For example, an inorganic acid or a fluorine compound may be further added.

According to the embodiment, the liquid agent is repeatedly used such that, after the denitration catalyst regeneration system 100*a* recovers the denitration catalyst from the liquid agent, the chemical cleaning reservoir 122 keeps storing the liquid agent without discharging the liquid agent to the waste liquid tank 129 and the next denitration catalyst is introduced to the liquid agent. However, the method of repeatedly use the liquid agent is not limited to this embodiment. The liquid agent cleaning unit 104*a* may be provided with a tank for temporarily storing the liquid agent and a circulation mechanism for circulating the liquid agent, and may once discharge the liquid agent from the chemical cleaning reservoir 122 to the tank and cause the circulation mechanism to introduce the liquid agent from the tank to the chemical cleaning reservoir 122 at time of use. Additionally, in this case, foreign matter in the liquid agent may be removed by use of e.g. a filter provided to the circulation mechanism.

In addition, according to the embodiment, it is also possible to efficiently use water by repeatedly using water to be used for prewashing and finish washing if the finish cleaning liquid is water in the denitration catalyst regeneration system 100*a*. Efficient use of water makes it possible to reduce the amount of waste liquid. To be more specific, as in the case of liquid agent cleaning unit 104*a*, even after a denitration catalyst washed with water is recovered from the reservoir 114, the evacuation reservoir 118, and the finish washing reservoir 130, the next denitration catalyst may be moved and washed in the water stored in the reservoir 114, the evacuation reservoir 118, and the finish washing reservoir 130. The finish cleaning liquid may be sulfamic acid-containing water and only the finish washing reservoir 130 may have sulfamic acid-containing water so as to increase the restoration rate for the catalytic performance during the regeneration processing to an even higher level. With this setup, the sulfamic acid-containing water may be stored. Furthermore, each of the prewashing reservoir 114, the evacuation reservoir 118, and the finish washing reservoir 130 may be provided with a tank for temporarily storing water and a circulation mechanism for circulating water. With this setup, water may once be discharged from the prewashing reservoir 114, the evacuation reservoir 118, and the finish washing reservoir 130 to the tank, and at time of use, the circulation mechanism may introduce again water from the tank to the prewashing reservoir 114, the evacuation reservoir 118, and the finish washing reservoir 130. Additionally, in this case, foreign matter contained in water may be removed by use of e.g. a filter provided to the circulation mechanism. The finish cleaning liquid may be sulfamic acid-containing water so as to increase the restoration rate for the catalytic performance during the regeneration processing to an even higher level. Only the finish washing reservoir 130 may be provided with a tank for temporarily storing sulfamic acid-containing water and a circulation mechanism for circulating sulfamic acid-containing water. With this setup, sulfamic acid-containing water may once be discharged from the finish washing reservoir 130 to the tank, and at time of use, the circulation mechanism may introduce again sulfamic acid-containing water from the tank to the finish washing reservoir 130. Additionally, also in this case, foreign matter contained in sulfamic acid-containing water may be removed by use of e.g. a filter provided to the circulation mechanism. A concentration meter may be provided to the circulation mechanism for the purpose of adding sulfamic acid-containing water depending on the concentration of sulfamic acid in the finish cleaning liquid.

The denitration catalyst regeneration system 100a is provided with different reservoirs for carrying out the processes of prewashing, evacuation, liquid agent cleaning, and finish washing, but may be provided with one reservoir which can perform these steps. Although the processing method has been described above in the case of executing the processes by detaching the denitration catalyst from the denitration equipment, the regeneration processing may be carried out while the denitration catalyst is kept installed to the denitration equipment. In this case, the denitration equipment is supplied with water or the liquid agent and waste liquid is collected from the denitration equipment.

In addition, the denitration catalyst regeneration system 100a may be further provided with a liquid agent temperature adjusting mechanism for adjusting the temperature of the liquid agent. If the liquid agent temperature adjusting mechanism is provided, it is possible to control the temperature of the liquid agent which is used for cleaning and impregnated in the denitration catalyst. Thus, the liquid agent temperature adjusting mechanism can maintain the temperature of the liquid agent at normal temperature or heat the liquid agent to a temperature higher than normal temperature, the liquid agent being used for cleaning and impregnated in the denitration catalyst.

Examples

Hereinafter, the present invention is described in further detail by use of Examples. The denitration catalyst regeneration method, the denitration catalyst regeneration system, and a cleaning agent for a denitration catalyst according to the present invention are not limited to Examples, to be described later.

1. Consideration I of Liquid Agent

First, the denitration catalyst regeneration method was carried out using several liquid agents with different inorganic acids and fluorine compounds mixed. For each of the liquid agents used, measurement was carried out for the restoration rate for the catalytic performance of the denitration catalyst (catalytic performance after regeneration processing/unused catalyst performance: K/K0), the silica concentration on the surface of the denitration catalyst (% by mass), and the calcium concentration on the surface of the denitration catalyst (% by mass). The reaction rate constant of the catalyst was used as an index of the catalytic performance. For comparison, the same measurement was carried out for an example (Comparative Example 1) where the regeneration processing was performed using a liquid agent with an organic acid and a fluorine compound mixed and for an example (Comparative Example 2) where the regeneration processing was performed using a liquid agent with an organic acid, a fluorine compound, and a surfactant mixed. For comparison, the values were measured for an unused denitration catalyst and a denitration catalyst before regeneration.

1-1. Preparation I of Liquid Agent

Example 1 used a liquid agent prepared at mixing ratios of 0.8% by mass of hydrochloric acid (HCl) as an inorganic acid and ammonium hydrogen fluoride ($NH_4HF_2$) as a fluorine compound with hydrogen fluoride 0.9% by mass. Example 2 used a liquid agent prepared at mixing ratios of 0.8% by mass of hydrochloric acid as an inorganic acid, 0.15% by mass of boric acid ($H_3BO_3$) as an inorganic acid, and ammonium hydrogen fluoride as a fluorine compound with hydrogen fluoride 0.9% by mass. Example 3 used a liquid agent prepared at mixing ratios of 3.5% by mass of sulfamic acid as an inorganic acid and ammonium hydrogen fluoride as a fluorine compound with hydrogen fluoride 1% by mass.

Comparative Example 1 used a liquid agent prepared at mixing ratios of 2.0% by mass of oxalic acid ($C_2H_2O_4$) as an organic acid and ammonium hydrogen fluoride as a fluorine compound with hydrogen fluoride 1% by mass. Comparative Example 2 used a liquid agent prepared at mixing ratios of 2.0% by mass of oxalic acid as an organic acid, 0.05% by mass of a phosphate ester as a surfactant, and ammonium hydrogen fluoride as a fluorine compound with hydrogen fluoride 1% by mass.

1-2. Performance I

Figure 5:
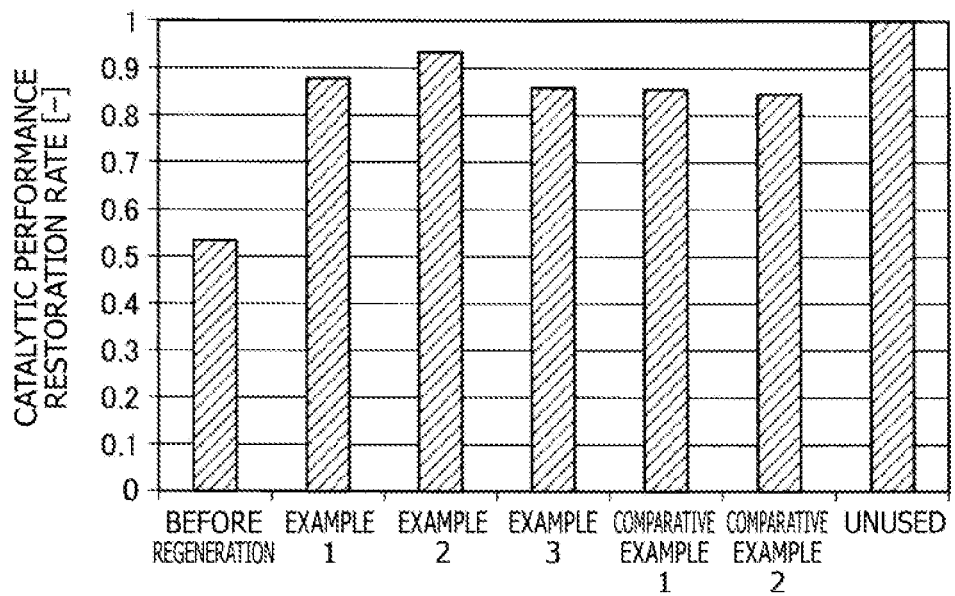
FIG. 5 is a graph showing measurement results for performance restoration rates of catalysts in Examples of the regeneration method.
Figure 6:
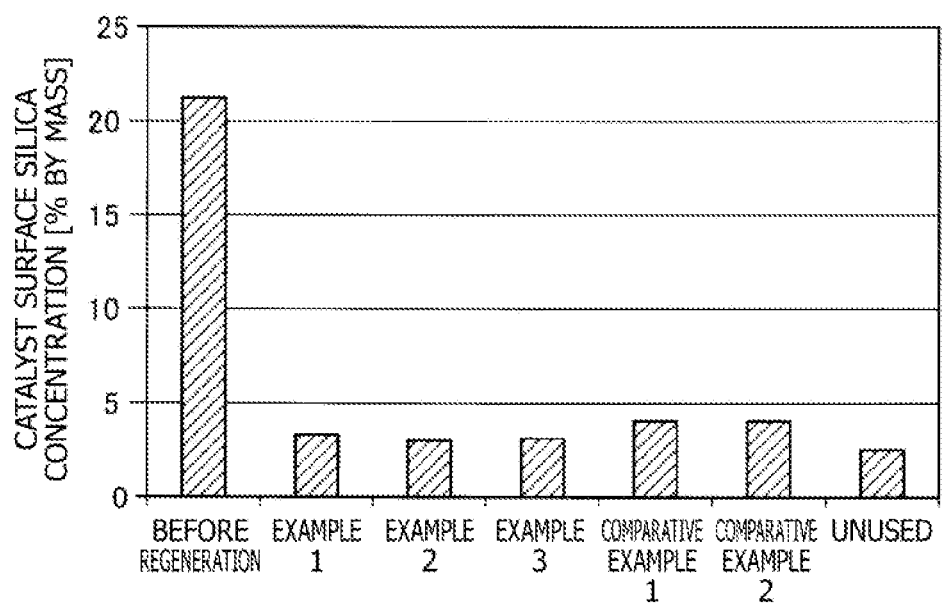
FIG. 6 is a graph showing measurement results for catalyst surface silica concentrations in Examples of the regeneration method.
Figure 7:
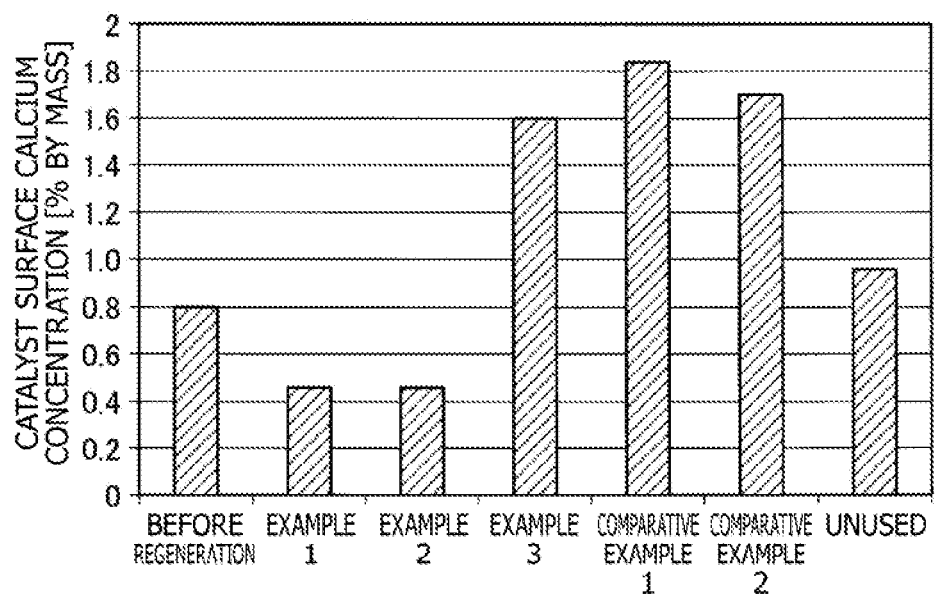
FIG. 7 is a graph showing measurement results for catalyst surface calcium in Examples of the regeneration method.

FIGS. 5 to 7 show measurement results for a denitration catalyst regenerated in Example 1 to Example 3, and Comparative Example 1 and Comparative Example 2, an unused denitration catalyst, and a denitration catalyst before regeneration. FIG. 5 shows measurement results for the restoration rates for the catalytic performance (K/K0) of the catalysts in Examples of the regeneration method. FIG. 6 shows measurement results for the catalyst surface silica concentrations (% by mass) in Examples of the regeneration method. FIG. 7 shows measurement results for the catalyst surface calcium concentrations (% by mass) in Examples of the regeneration method.

As shown in FIG. 5, in comparison with the case before regeneration, the performance restoration rate of the catalyst is higher in all of Example 1 to Example 3, and Comparative Example 1 and Comparative Example 2. To be more specific, it turned out that in comparison with the case before regeneration, the catalytic performance was higher. It turned out that as shown in FIG. 6, silica was successfully removed during the regeneration processing since the silica concentration on the surface of the denitration catalyst is lower in all of Example 1 to Example 3, and Comparative Example 1 and Comparative Example 2 in comparison with the case before regeneration. Furthermore, as shown in FIG. 7, the calcium concentration can be lowered to a greater extent if the liquid agents in Example 1 to Example 3 are used in comparison with the liquid agents used in Comparative Example 1 and Comparative Example 2. Thus, it turned out that prevention of readhesion of calcium was successful.

What is more, as indicated in Example 1 and Example 2, it turned out that if hydrochloric acid is used as an inorganic acid, it is possible to increase the performance restoration rate of the catalyst to a higher level and to drastically reduce the adhesion of calcium in comparison with Comparative Examples 1 and 2 and Example 3.

2. Consideration II of Liquid Agent

The denitration catalyst regeneration method was carried out using several liquid agents with surfactants mixed. For each of the liquid agents used, measurement was carried out for the restoration rate for the catalytic performance of the denitration catalyst (catalytic performance after regeneration processing/unused catalyst performance: K/K0), the silica concentration on the surface of the denitration catalyst ([% by mass]), and the calcium concentration on the surface of the denitration catalyst (% by mass).

2-1. Preparation II of Liquid Agent

Example 4 used a liquid agent prepared at mixing ratios of 0.8% by mass of hydrochloric acid, 0.15% by mass of boric acid, 0.05% by mass of a phosphate ester as a surfactant, and ammonium hydrogen fluoride with hydrogen fluoride 0.9% by mass. Example 5 used a liquid agent prepared at mixing ratios of 0.8% by mass of hydrochloric acid, 0.05% by mass of a phosphate ester as a surfactant, and ammonium hydrogen fluoride with hydrogen fluoride 0.9% by mass. Example 6 used a liquid agent prepared at mixing ratios of 0.8% by mass of hydrochloric acid, 0.15% by mass of boric acid, 0.05% by mass of a polyoxyethylene derivative as a surfactant, and ammonium hydrogen fluoride with hydrogen fluoride 0.9% by mass. Example 7 used a liquid agent prepared at mixing ratios of 3.5% by mass of sulfamic acid, 0.05% by mass of a phosphate ester as a surfactant, and ammonium hydrogen fluoride with hydrogen fluoride 1% by mass. Example 8 used a liquid agent prepared at mixing ratios of 3.5% by mass of sulfamic acid, 0.05% by mass of a phosphate ester as a surfactant which is of a kind different from Example 7, and ammonium hydrogen fluoride with hydrogen fluoride 1% by mass. Example 9 used a liquid agent prepared at mixing ratios of 3.5% by mass of sulfamic acid, 0.05% by mass of a polyoxyethylene derivative as a surfactant, and ammonium hydrogen fluoride with hydrogen fluoride 1% by mass.

2-2. Performance II

Figure 8:
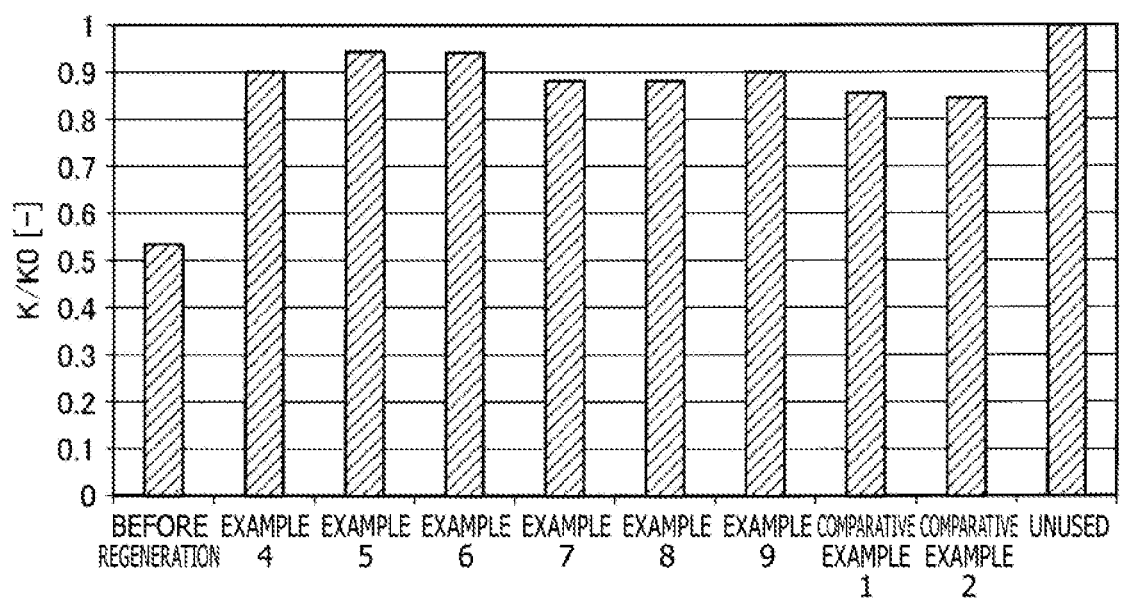
FIG. 8 is a graph showing measurement results for performance restoration rates of catalysts in Examples of the regeneration method.
Figure 9:
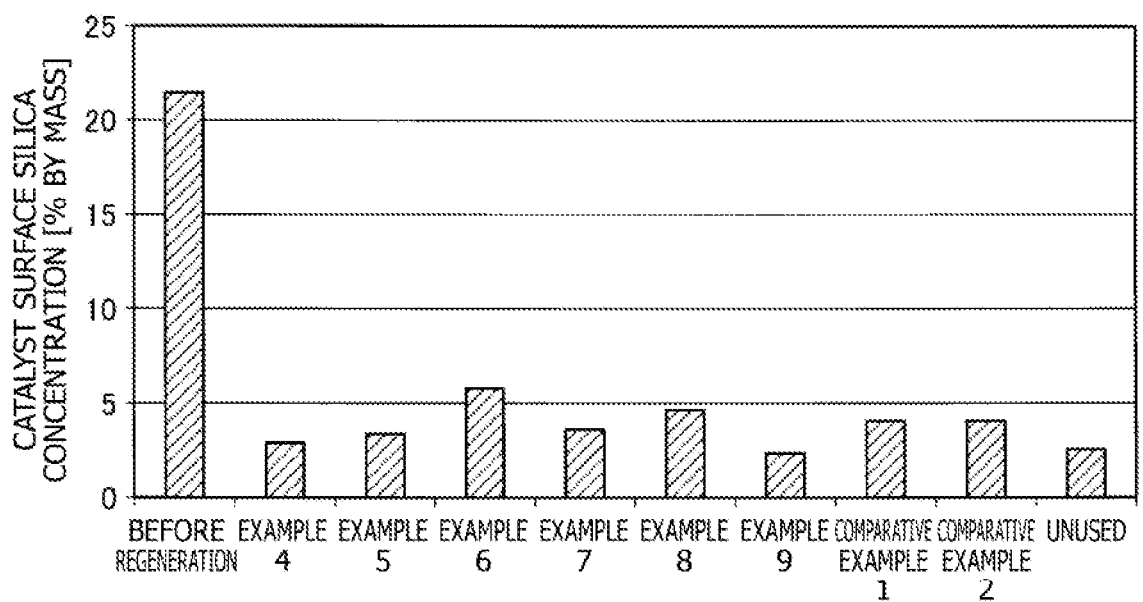
FIG. 9 is a graph showing measurement results for catalyst surface silica concentrations in Examples of the regeneration method.
Figure 10:
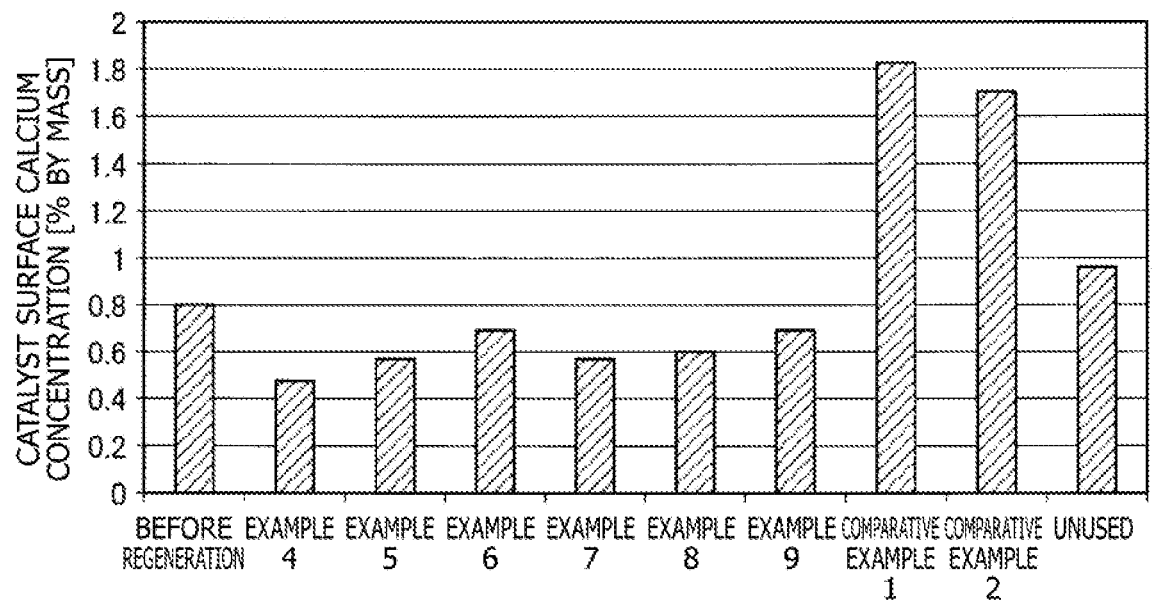
FIG. 10 is a graph showing measurement results for catalyst surface calcium in Examples of the regeneration method.

FIGS. 8 to 10 show measurement results for a denitration catalyst regenerated in Example 4 to Example 9, and Comparative Example 1 and Comparative Example 2, an unused denitration catalyst, and a denitration catalyst before regeneration. FIG. 8 shows measurement results for the restoration rates for the catalytic performance of the catalysts in Examples of the regeneration method. FIG. 9 shows measurement results for the catalyst surface silica concentrations in Examples of the regeneration method. FIG. 10 shows measurement results for the catalyst surface calcium concentrations in Examples of the regeneration method.

As shown in FIGS. 8 to 10, in Example 4 to Example 9, it turned out that if the liquid agent contains a surfactant, it is possible to increase the performance restoration rate of the catalyst to a higher level and to drastically reduce the adhesion of calcium in comparison with Comparative Examples 1 and 2. In addition, as indicated in Example 4 to Example 9, it turned out that it is possible to drastically reduce the adhesion of calcium in all of the cases of using only hydrochloric acid, using hydrochloric acid and boric acid, and using sulfamic acid as an inorganic acid. To be more specific, it turned out that if hydrochloric acid is used as an inorganic acid, it is possible to more drastically reduce the adhesion of calcium in Example 4 which uses a liquid agent containing a surfactant than in Example 1 which does not include a liquid agent containing a surfactant. It turned out that if hydrochloric acid and boric acid are used as inorganic acids, it is possible to more drastically reduce the adhesion of calcium in Example 5 which uses a liquid agent containing a surfactant than in Example 2 which does not include a liquid agent containing a surfactant. Furthermore, it turned out that if sulfamic acid is used as an inorganic acid, it is possible to more drastically reduce the adhesion of calcium in Examples 6, 7, and 8 which use a liquid agent containing a surfactant than in Example 3 which does not include a liquid agent containing a surfactant. As described above, it turned out that it is possible to drastically reduce the adhesion of calcium regardless of the kind of inorganic acid by using a surfactant. Meanwhile, it turned out that as indicated in Examples 4, 5, 7, and 8, it is possible to increase the catalytic performance to a high level even in the case of using as a surfactant an agent which contains phosphorus, known as a deactivating component of a catalyst.

3. Consideration of Process Time

Measurement was carried out for the relationship between the time (process time: minutes) of immersing the denitration catalyst in the liquid agent during one cycle of regeneration processing and each of the restoration rate for the catalytic performance of the denitration catalyst (catalytic performance after regeneration processing/unused catalyst performance: K/K0), the silica concentration on the surface of the denitration catalyst (% by mass), and the calcium concentration on the surface of the denitration catalyst (% by mass).

3-1. Performance IV

Figure 11:
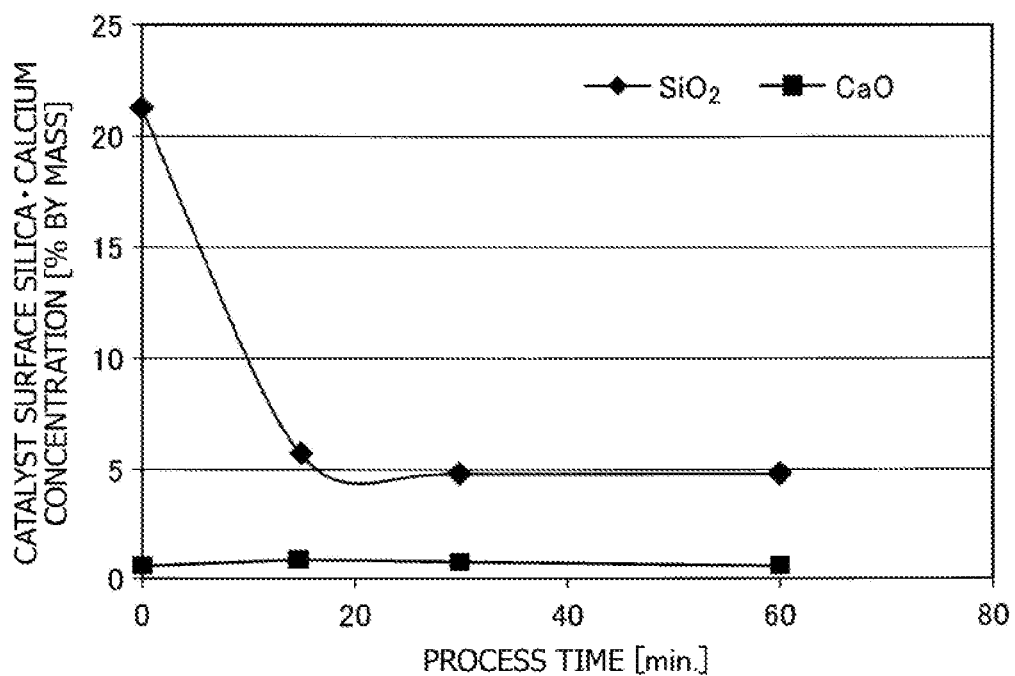
FIG. 11 is a graph showing measurement results for a relationship between process time for chemical cleaning and a concentration of matter adhering to a surface of a catalyst.
Figure 12:
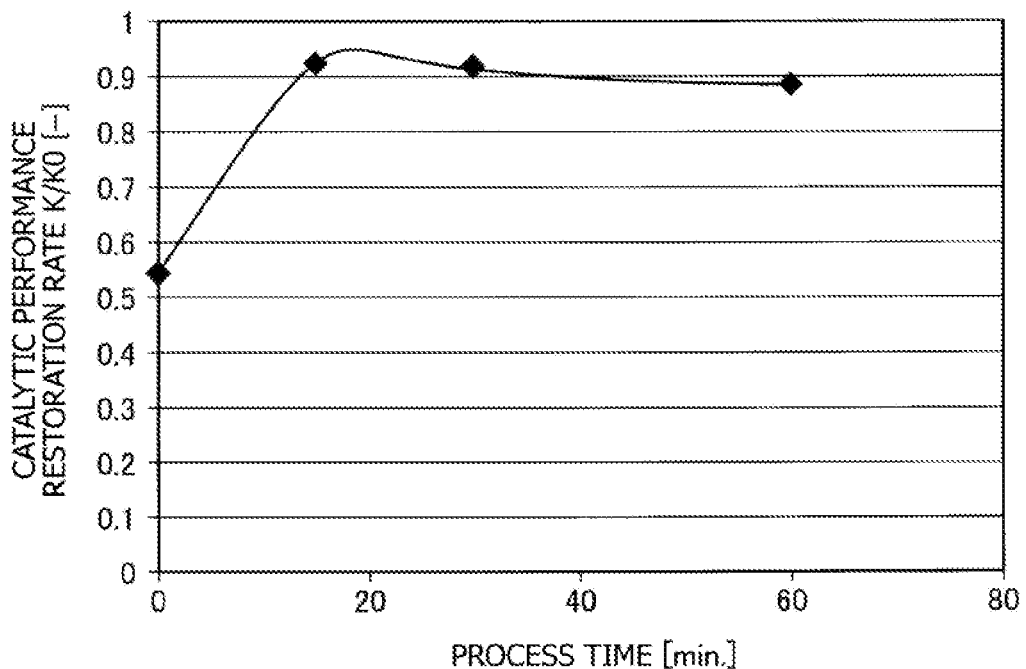
FIG. 12 is a graph showing measurement results for a relationship between the process time for the chemical cleaning and the performance restoration rate of a denitration catalyst.

FIGS. 11 and 12 show the measurement results. FIG. 11 shows measurement results for the relationship between the process time and the concentration of matter adhering to the surface of the catalyst. FIG. 12 shows measurement results for the relationship between the process time and the performance restoration rate of the denitration catalyst. As shown in FIGS. 11 and 12, it turned out that if the process time is 15 minutes or more, it is possible to restore the performance restoration rate of the denitration catalyst to 0.8 or more, i.e. 80% of that for an unused one while maintaining the concentration of calcium at a low level. If the process time is 60 minutes or less, it is possible to avoid an excessively long process time. Furthermore, it turned out that it is possible to prevent elution of the glass fibers contained in the catalyst and thus to prevent excessive reduction of the strength of the catalyst. As described above, it turned out that if the process time is 15 minutes or more and 60 minutes or less, it is possible to avoid an excessively long process time and to increase the performance restoration rate of the denitration catalyst because the catalyst surface silica concentration is reduced to 6% by mass or less.

4. Consideration of Number of Uses

By repeatedly using the liquid agent, measurement was carried out for the relationship between the number of uses and the restoration rate for the catalytic performance of the denitration catalyst (catalytic performance after regeneration processing/unused catalyst performance: K/K0). Also in the case of repeatedly using the liquid agent, each time the liquid agent was used, an inorganic acid and fluoride were added, the amounts of which corresponded to those which reacted during the preceding regeneration processing. Example 10 used a liquid agent prepared at mixing ratios of 3.5% by mass of sulfamic acid as an inorganic acid, 0.05% by mass of the phosphate ester as a surfactant which is the same as in Example 8, and ammonium hydrogen fluoride as a fluorine compound with hydrogen fluoride 1% by mass. Example 11 used the same liquid agent as in Example 10, and the amount of inorganic acid and fluorine compound added was multiplied by two each time the liquid agent was used. Example 12 used a liquid agent prepared at mixing ratios of 0.8% by mass of hydrochloric acid as an inorganic acid, 0.15% by mass of boric acid as an inorganic acid, and ammonium hydrogen fluoride as a fluorine compound with hydrogen fluoride 0.9% by mass.

4-1. Performance V

Figure 13:
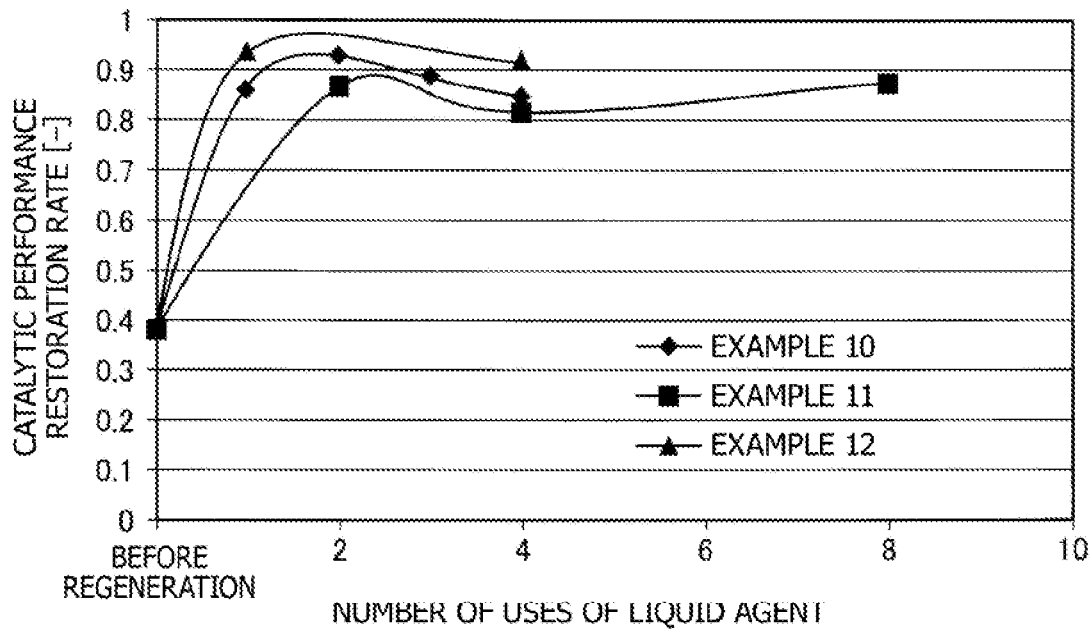
FIG. 13 is a graph showing measurement results for a relationship between the number of uses of a liquid agent and the performance restoration rate of a denitration catalyst.

FIG. 13 shows the measurement results. FIG. 13 shows measurement results for the relationship between the number of uses of the liquid agent and the restoration rate for the catalytic performance of the denitration catalyst in relation to Example 10 to Example 12. As shown in FIG. 13, it turned out that it is possible to restore the catalytic performance to a similar extent even in the case of repeatedly using the liquid agent. Hence, it turned out that it is possible to reduce the used amount and the wasted amount of liquid agent.

5. Consideration I of Finish Cleaning Liquid

On an actual scale, measurement was carried out for the relationship between the number of repeated uses of the cleaning liquid and the restoration rate for the catalytic performance of the denitration catalyst (catalytic performance after regeneration processing/unused catalyst performance) by using the liquid agent containing a surfactant and repeatedly carrying out the denitration catalyst regeneration method using several finish cleaning liquids with different components. Example 13 used a cleaning liquid prepared such that the finish cleaning liquid contained 0.5 mol/l of sulfamic acid. In addition, as the liquid agent, Example 13 used the same liquid agent as in Example 10. Example 14 used a cleaning liquid prepared such that the finish cleaning liquid contained 1 mol/l of sulfamic acid. In addition, Example 14 used a liquid agent prepared at mixing ratios of 5.3% by mass of sulfamic acid as an inorganic acid, 0.075% by mass of a phosphate ester as a surfactant, and ammonium hydrogen fluoride as a fluorine compound with hydrogen fluoride 1.5% by mass.

5-1. Performance VI

Figure 14A:
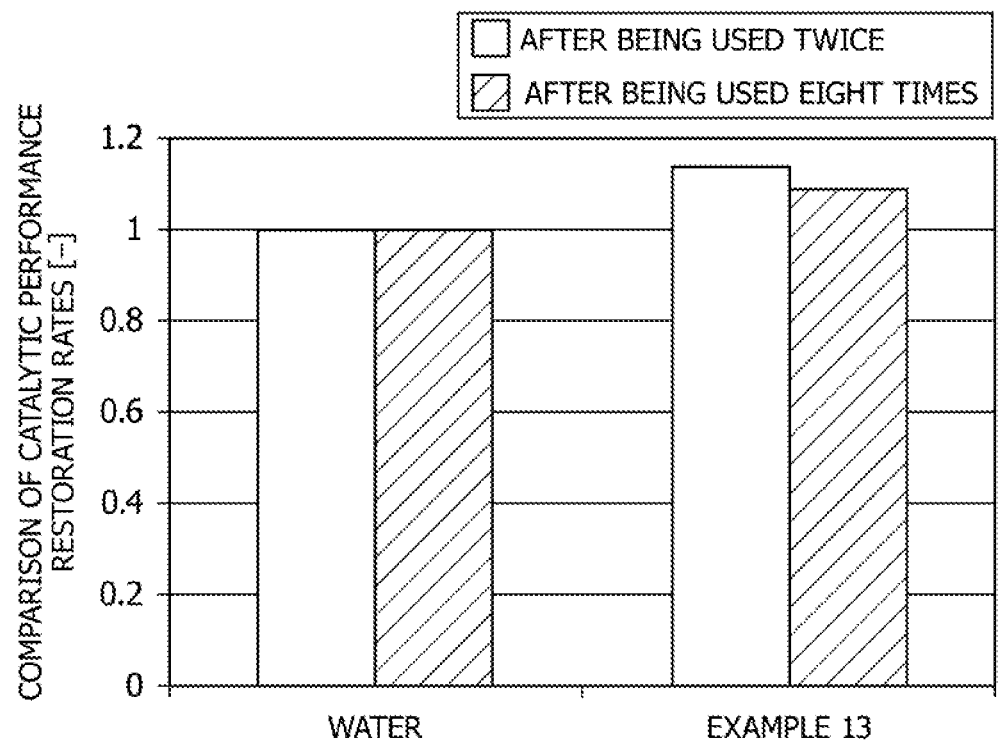
FIG. 14A is a graph showing measurement results for a relationship between the number of uses of a finish cleaning liquid and the performance restoration rate of a denitration catalyst.
Figure 14B:
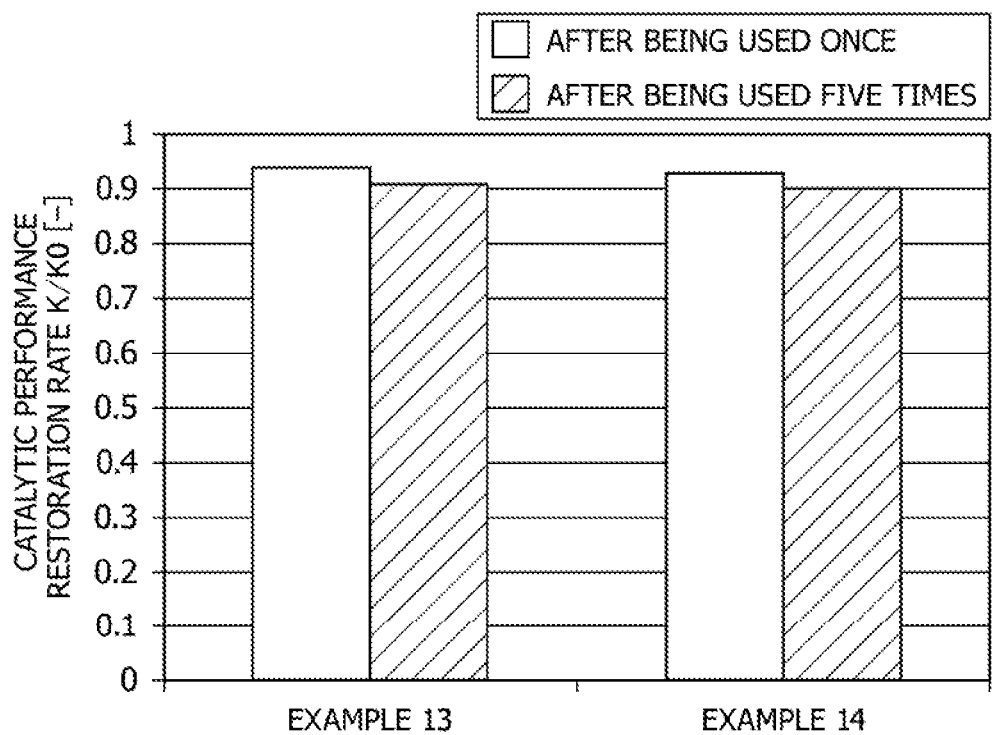
FIG. 14B is a graph showing measurement results for a relationship between the number of uses of the finish cleaning liquid and the performance restoration rate of a denitration catalyst.

FIGS. 14A and 14B show the measurement results. FIG. 14A shows the restoration rate for the catalytic performance after the cleaning liquid is repeatedly used twice and eight times in Example 13, and denotes by 1 the case in which the finish cleaning liquid is water. FIG. 14B shows the restoration rate for the catalytic performance of the denitration catalyst for the case in which in Example 13 and Example 14, the cleaning liquid is repeatedly used once and five times. As shown in FIG. 14A, in comparison with the case where the finish cleaning liquid is water only, it turned out that Example 13 containing sulfamic acid demonstrates the restoration performance of the denitration catalyst higher by 15% or more even when the cleaning liquid is repeatedly used twice, and demonstrates the performance restoration rate of the denitration catalyst higher by 10% or more even when the cleaning liquid is repeatedly used eight times. As shown in FIG. 14B, it turned out that in Example 14 containing 1 mol/of sulfamic acid, it is possible to maintain the restoration rate for the catalytic performance at a level similar to that of Example 13 even when the cleaning liquid is repeatedly used five times. It turned out from the results that if the concentration of sulfamic acid in the finish cleaning liquid is at least 0.5 mol, it is possible to maintain the restoration rate for the catalytic performance of the denitration catalyst at a high level even when the cleaning liquid is repeatedly used.

6. Consideration III of Liquid Agent

On a laboratory scale, the denitration catalyst regeneration method was carried out using several liquid agents (cleaning agents) with different surfactants. For each of the liquid agents used, measurement was carried out for the crushing strength and the performance restoration rate of the denitration catalyst. The denitration catalyst test sample was a denitration catalyst subjected to 50,000 hours of denitration processing in an actual power generation plant. In addition, the denitration catalyst was a honeycomb catalyst which contains titanium dioxide ($TiO_2$) as a main component supporting vanadium pentoxide ($V_2O_5$) and tungsten oxide ($WO_3$).

6-1. Preparation III of Liquid Agent

Example 15 used a liquid agent prepared at mixing ratios of 3.2% by mass of sulfamic acid, 0.05% by mass of commercial surfactant A as a nonionic surfactant which contains polyoxyethylene polyoxypropylene glycol as a main component, and ammonium hydrogen fluoride with hydrogen fluoride 1.75% by mass. Example 16 used a liquid agent prepared at mixing ratios of 2.4% by mass of hydrochloric acid, 0.15% by mass of boric acid, 0.05% by mass of surfactant A as a nonionic surfactant, and ammonium hydrogen fluoride with hydrogen fluoride 1.26% by mass. Example 17 used a liquid agent prepared at mixing ratios of 2.4% by mass of hydrochloric acid, 0.15% by mass of boric acid, 0.05% by mass of commercial surfactant B as a nonionic surfactant which contains a polyalkylene glycol derivative as a main component, and ammonium hydrogen fluoride with hydrogen fluoride 1.26% by mass. Example 18 used a liquid agent prepared at mixing ratios of 2.4% by mass of hydrochloric acid, 0.15% by mass of boric acid, 0.05% by mass of commercial surfactant C as an anionic surfactant which contains a polyoxyethylene alkyl (C8) ether phosphate 6 ester-monoethanolamine salt as a main component, and ammonium hydrogen fluoride with hydrogen fluoride 1.26% by mass.

Comparative Example 3 used a liquid agent prepared at mixing ratios of 3.2% by mass of sulfamic acid and ammonium hydrogen fluoride with hydrogen fluoride 1.75% by mass. Comparative Example 4 used a liquid agent prepared at mixing ratios of 2.4% by mass of hydrochloric acid, 0.15% by mass of boric acid, and ammonium hydrogen fluoride with hydrogen fluoride 1.26% by mass.

6-2. Measurement of Catalytic Performance

The catalytic performance of each catalyst was measured with gases having properties indicated in Table 1 below by use of a tubular flow test reactor.

TABLE 1

| Gas Properties | |
| --- | --- |
| Gas Flow Rate | 200 (NL/h)/Dry-Base |
| | 220 (NL/h)/Wet-Base |
| Temperature | 380° C. |
| $O_2$ | 4.0% |
| NO | 150 ppm |
| $NH_3$ | 150 ppm |
| $SO_x$ | 800 ppm |
| $CO_2$ | 12% |
| $H_2O$ | 9.1% |
| N | Base |

First, the reaction rate constant K0 of the denitration catalyst yet to be used in actual equipment (unused denitration catalyst) was obtained through the above measurement of the catalytic performance. Next, by use of cleaning liquids of Examples, cleaning process was performed on the catalysts of which catalytic performance was reduced due to the denitration process. The cleaning process was chemical cleaning in which the catalyst was prewashed three minutes and thereafter immersed in the cleaning liquid for 60 minutes. After that, the catalyst subjected to chemical cleaning was finish-washed for 30 minutes and dried overnight at 110° C. The reaction rate constant K was obtained for each of the catalysts after the drying and the regeneration processing by the same method as in the measurement of the catalytic performance described above. For each catalyst, the restoration rate for the catalytic performance (catalytic performance after regeneration processing/unused catalyst performance: K/K0) was obtained in the same manner as in Example 1 to Example 15.

6-3. Measurement of Crushing Strength

Crushing strength was measured with a Kiya hardness tester for each of the catalysts after the cleaning process in a manner as in the Table shown in FIG. 16. As indicated in the Table shown in FIG. 16, the value of the crushing strength in the wall direction was the average value ($N/cm^2$) measured for five similar catalysts prepared. The crushing strength in the wall direction of a catalyst was a strength determined when a honeycomb catalyst is pressed on the wall surface side without pores.

6-3. Performance VI

The measurement results are indicated in Table 3 below. The table indicates the crushing strength in the wall direction and the restoration rate for the catalytic performance of a used catalyst (uncleaned catalyst) before the cleaning process described above as a reference example.

TABLE 3

Effects of Cleaning Liquid

| | Composition of Cleaning Liquid | | | Crushing Strength in Wall Direction ($N/cm^2$) | Catalytic Performance Restoration Rate (K/K0) |
|---|---|---|---|---|---|
| | Fluorine Compound | Inorganic Acid | Surfactant | | |
| Example 15 | $NH_4NF_2$ | $H_3NSO_3$ | — | surfactant A | 109.2 | 0.98 |
| Example 16 | $NH_4NF_2$ | HCl | $H_3BO_3$ | surfactant A | 114.4 | — |
| Example 17 | $NH_4NF_2$ | HCl | $H_3BO_3$ | smfactant B | 136.6 | 1.08 |
| Example 18 | $NH_4NF_2$ | HCl | $H_3BO_3$ | surfactant C | 122.4 | — |
| Comparative Example 3 | $NH_4NF_2$ | $H_3NSO_3$ | — | — | 75.1 | 0.81 |
| Comparative Example 4 | $NH_4NF_2$ | HCl | $H_3BO_3$ | — | 94.6 | 1.06 |
| Reference Example uncleaned ) | | — | | | 148 | 0.55 |

As indicated in Table 3, the crushing strength in the wall direction was 109.2 $N/cm^2$ in Example 15 containing surfactant A being a nonionic surfactant, which is approximately 74% of that of an uncleaned catalyst. It turned out that it is possible to prevent excessive a reduction of the crushing strength in the wall direction. In addition, it turned out in Example 15 that it is possible to restore the catalytic performance to approximately 98% of that of an unused denitration catalyst. On the other hand, it turned out that, in Comparative Example 3 not containing a surfactant, the crushing strength in the wall direction is reduced to 75.1 $N/cm^2$, which is approximately 51% of that of an uncleaned catalyst. In Comparative Example 3, it turned out that the catalytic performance is reduced to approximately 81% of that of an unused denitration catalyst. Thus, it turned out in Example 15 containing surfactant A being a nonionic surfactant, that it is possible to improve the reduction of the crushing strength in the wall direction and to increase the restoration rate for the catalytic performance to a higher level in comparison with Comparative Example 3. Furthermore, the crushing strength in the wall direction was 114.4 $N/cm^2$ in Example 16 containing surfactant A being a nonionic surfactant, which is approximately 77% of that of an uncleaned catalyst. It turned out that it is possible to prevent excessive reduction of the crushing strength in the wall direction. On the other hand, it turned out that, in Comparative Example 3 containing hydrochloric acid as an inorganic acid and not containing a surfactant, the crushing strength in the wall direction is reduced to 94.6 $N/cm^2$, which is approximately 64% of that of an uncleaned catalyst. Thus, although Example 15 and Example 16 containing surfactant A being a nonionic surfactant contain the same inorganic acid and fluorine compound as those in Comparative Example 3 and Comparative Example 4, Example 15 and Example 16 can improve the reduction of the crushing strength in the wall direction in comparison with Comparative Example 3 and Comparative Example 4 not containing a surfactant.

The crushing strength in the wall direction was 136.6 $N/cm^2$ in Example 17 containing surfactant B being a nonionic surfactant, which is approximately 92% of that of an uncleaned catalyst. It turned out that it is possible to prevent excessive reduction of the crushing strength in the wall direction. In addition, it turned out in Example 17 that it is possible to restore the catalytic performance to approximately 108% of that of an unused denitration catalyst. Thus, it tuned out in Example 17 containing surfactant B being a nonionic surfactant, that it is possible to improve the reduction of the crushing strength in the wall direction and to increase the restoration rate for the catalytic performance to a higher level in comparison with Comparative Example 3 and Comparative Example 4.

The crushing strength in the wall direction was 122.4 $N/cm^2$ in Example 18 containing surfactant C being an anionic surfactant, which is approximately 83% of that of an uncleaned catalyst. It turned out that it is possible to prevent excessive reduction of the crushing strength in the wall direction. Thus, it turned out in Example 18 containing surfactant C being an anionic surfactant, that it is possible to improve the reduction of the crushing strength in the wall direction in comparison with Comparative Example 3 and Comparative Example 4.

7. Consideration II of Finish Cleaning Liquid

The denitration catalyst regeneration method was repeatedly carried out using the same liquid agent and the same finish cleaning liquid, and measurement was carried out for the relationship between the number of uses of the cleaning liquid and the restoration rate for the catalytic performance of the denitration catalyst (K/K0). As the finish cleaning liquid, Example 19 used the same finish cleaning liquid as in Example 14 and the same liquid agent as in Example 15.

7-1. Performance VII

Figure 15A:
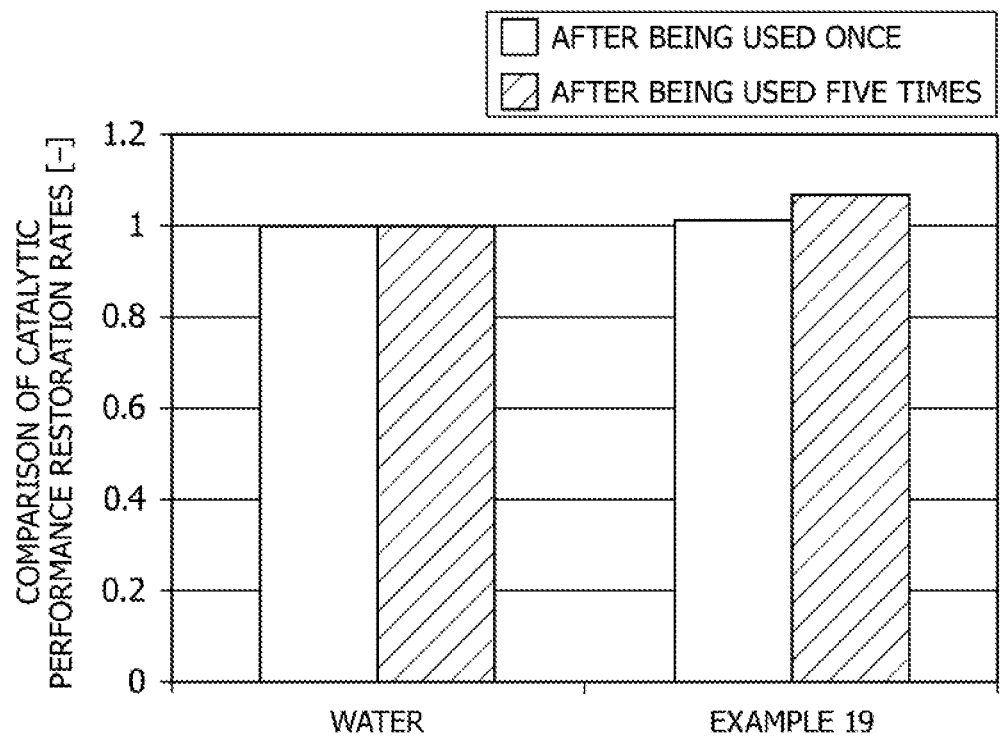
FIG. 15A is a graph showing measurement results for a relationship between the number of uses of a finish cleaning liquid and the performance restoration rate of a denitration catalyst.
Figure 15B:
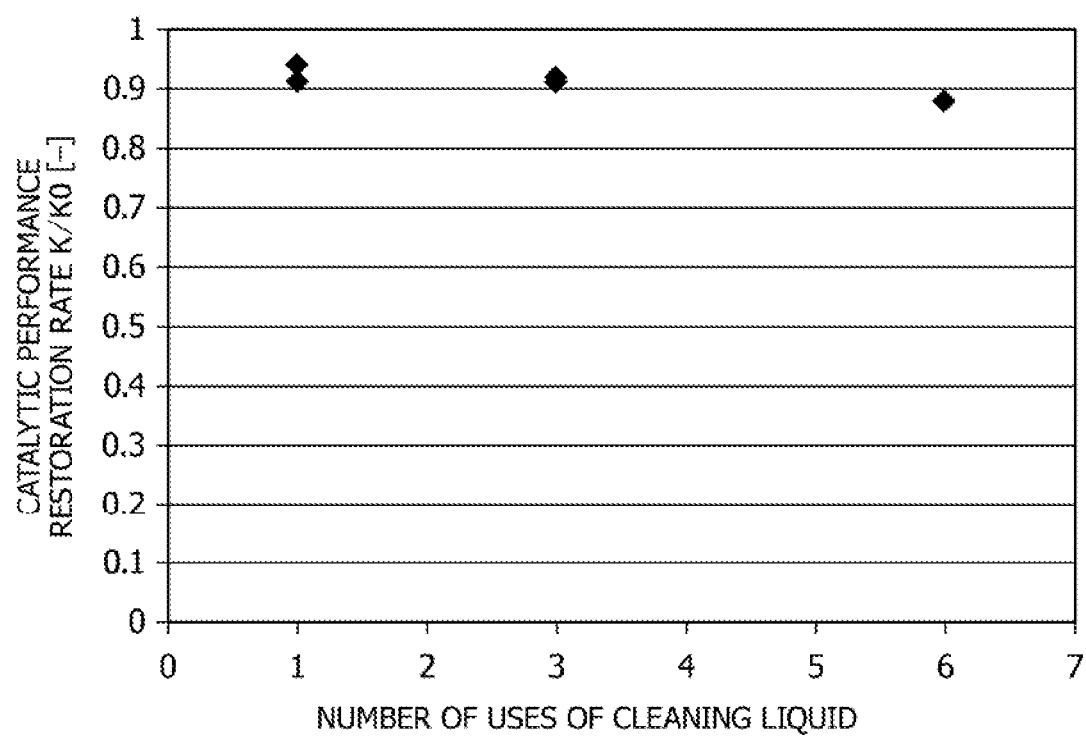
FIG. 15B is a graph showing measurement results for a relationship between the number of uses of the finish cleaning liquid and the performance restoration rate of a denitration catalyst.

FIGS. 15A and 15B show the measurement results. FIG. 15A shows the restoration rate for the catalytic performance of the denitration catalyst after the cleaning liquid is repeatedly used once and five times in Example 19, and denotes by 1 the case in which the finish cleaning liquid is water. FIG. 15B shows the relationship in Example 19 between the number of uses of the cleaning liquid and the restoration rate for the catalytic performance of the denitration catalyst. As shown in FIG. 15A, it turned out in Example 19 containing sulfamic acid that it is possible to increase the restoration rate for the catalytic performance of the denitration catalyst by 5% or more in comparison with the case in which the finish 6 cleaning liquid is water only even after the cleaning liquid is repeatedly used five times. Furthermore, as shown in FIG. 15B, it turned out that although there are errors in the measurement values, it is possible to maintain the restoration rate for the catalytic performance of the denitration catalyst at a high level of 90% or more even after the cleaning liquid is repeatedly used three times, and to maintain the restoration rate for the catalytic performance of the denitration catalyst at a high level of approximately 90% even after the cleaning liquid is repeatedly used six times.

INDUSTRIAL APPLICABILITY

The denitration catalyst regeneration method, the denitration catalyst regeneration system, and a cleaning liquid for a denitration catalyst according to the present invention make it possible to efficiently remove matter adhering to the surface of a catalyst, to greatly restore the catalytic performance, and to prevent excessive reduction of the crushing strength.

REFERENCE SIGNS LIST

10 pulverized coal fired boiler
50 denitration equipment
82a, 84a, 86a denitration catalyst
100, 100a denitration catalyst regeneration system
102, 102a prewashing unit
104, 104a liquid agent cleaning unit
106, 106a finish washing unit
108, 108a drying unit
112 catalyst transporting apparatus
114 prewashing reservoir
116 water supplying apparatus
118 evacuation reservoir
120 vacuum pump
122 chemical cleaning reservoir
130 finish washing reservoir

The invention claimed is:

1. A method of regenerating a denitration catalyst, comprising:
   a prewashing step of washing a denitration catalyst with water;
   a liquid agent cleaning step of immersing the denitration catalyst washed with water in a liquid agent containing an inorganic acid and a fluorine compound;
   a step of recovering the denitration catalyst from the liquid agent; and
   a finish washing step of washing the denitration catalyst recovered from the liquid agent with a finish cleaning liquid which is water or sulfamic acid-containing water,
   wherein the inorganic acid includes hydrochloric acid, includes hydrochloric acid and boric acid, or includes sulfamic acid.

2. The method of generating a denitration catalyst according to claim 1, wherein the liquid agent further contains a surfactant, and wherein the surfactant is a nonionic surfactant or an anionic surfactant.

3. The method of generating a denitration catalyst according to claim 2, wherein the nonionic surfactant is a surfactant which contains polyoxyethylene polyoxypropylene glycol, a polyoxyethylene derivative, or a polyalkylene glycol derivative as a main component.

4. The method of generating a denitration catalyst according to claim 2, wherein the anionic surfactant is a surfactant which contains polyoxyalkylene alkyl ether phosphate ester as a main component.

5. The method of generating a denitration catalyst according to claim 1, wherein the inorganic acid includes hydrochloric acid or includes hydrochloric acid and boric acid.

6. The method of generating a denitration catalyst according to claim 1, wherein the inorganic acid includes sulfamic acid.

7. The method of generating a denitration catalyst according to claim 1, including reducing a surface silica concentration after restoration of the denitration catalyst to 6% by mass or less.

8. The method of generating a denitration catalyst according to claim 1, wherein the prewashing step includes immersing the denitration catalyst in water inside a reservoir, sealing the reservoir, and evacuating air inside the reservoir.

9. The method of generating a denitration catalyst according to claim 1, wherein the liquid agent cleaning step includes repeatedly using the liquid agent.

10. A system for regenerating a denitration catalyst, comprising:
    a prewashing unit which washes a denitration catalyst with water;
    a liquid agent cleaning unit which immerses the denitration catalyst washed with water in a liquid agent containing an inorganic acid and a fluorine compound, wherein the inorganic acid includes hydrochloric acid, includes hydrochloric acid and boric acid, or includes sulfamic acid; and
    a finish washing unit which finish-washes the denitration catalyst recovered from the liquid agent with a finish cleaning liquid which is water or sulfamic acid-containing water.

11. A cleaning agent which cleans a deactivated denitration catalyst for a coal fired boiler and which includes an aqueous solution containing an inorganic acid and a fluorine compound, wherein the inorganic acid includes hydrochloric acid, includes hydrochloric acid and boric acid, or includes sulfamic acid.

12. The cleaning agent according to claim 11, further comprising a surfactant, wherein the surfactant is a nonionic surfactant or an anionic surfactant.

13. The cleaning agent according to claim 12, wherein the nonionic surfactant is a surfactant which contains polyoxyethylene polyoxypropylene glycol, a polyoxyethylene derivative, or a polyalkylene glycol derivative as a main component.

14. The cleaning agent according to claim 12, wherein the anionic surfactant is a surfactant which contains polyoxyalkylene alkyl ether phosphate ester as a main component.

15. The cleaning agent according to claim 11, wherein the inorganic acid includes hydrochloric acid or includes hydrochloric acid and boric acid.

16. The cleaning agent according to claim 11, wherein the inorganic acid includes sulfamic acid.

* * * * *